US011861797B2

(12) United States Patent
Yip et al.

(10) Patent No.: US 11,861,797 B2
(45) Date of Patent: Jan. 2, 2024

(54) METHOD AND APPARATUS FOR TRANSMITTING 3D XR MEDIA DATA

(71) Applicant: Samsung Electronics Co., Ltd., Suwon-si (KR)

(72) Inventors: Eric Yip, Suwon-si (KR); Hyunkoo Yang, Suwon-si (KR); Jaeyeon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/384,077

(22) Filed: Jul. 23, 2021

(65) Prior Publication Data

US 2022/0028172 A1    Jan. 27, 2022

(30) Foreign Application Priority Data

Jul. 23, 2020 (KR) .......................... 10-2020-0091697

(51) Int. Cl.
*G06T 19/00* (2011.01)
*H04L 65/1069* (2022.01)
*H04L 65/75* (2022.01)
*H04L 67/131* (2022.01)

(52) U.S. Cl.
CPC ........ *G06T 19/006* (2013.01); *H04L 65/1069* (2013.01); *H04L 65/75* (2022.05); *H04L 67/131* (2022.05)

(58) Field of Classification Search
None
See application file for complete search history.

(56) References Cited

U.S. PATENT DOCUMENTS

| 10,623,456 | B2 | 4/2020 | Chiang et al. |
| 10,863,235 | B2 | 12/2020 | Yip et al. |
| 11,107,292 | B1* | 8/2021 | Little ........................ G09B 5/02 |
| 2013/0275615 | A1* | 10/2013 | Oyman ............ H04N 21/25833 709/231 |
| 2016/0353058 | A1* | 12/2016 | Caviedes ................. H04N 7/15 |
| 2017/0054777 | A1* | 2/2017 | Leung ..................... H04L 65/75 |
| 2017/0272779 | A1 | 9/2017 | Neff et al. |

(Continued)

FOREIGN PATENT DOCUMENTS

| KR | 10-2008-0049701 A | 6/2008 |
| KR | 10-2018-0029344 A | 3/2018 |

(Continued)

OTHER PUBLICATIONS

International Search Report and Written Opinion dated Nov. 3, 2021, issued in International Patent Application No. PCT/KR2021/009541.

(Continued)

*Primary Examiner* — Yingchun He
(74) *Attorney, Agent, or Firm* — Jefferson IP Law, LLP

(57) ABSTRACT

A method performed by a first terminal is provided. The method includes identifying capabilities of the first terminal connected to at least one component device, establishing, via a server, a session associated with an augmented reality (AR) service based on the capabilities of the first terminal, performing pre-processing on 3 dimensional (3D) media data acquired by the at least one component device, and transmitting, to a second terminal, the pre-processed 3D media data.

20 Claims, 14 Drawing Sheets

(56) References Cited

U.S. PATENT DOCUMENTS

| | | | |
|---|---|---|---|
| 2018/0077210 A1* | 3/2018 | Hannuksela | H04L 65/60 |
| 2018/0077451 A1 | 3/2018 | Yip et al. | |
| 2018/0240275 A1* | 8/2018 | Clements | G16H 80/00 |
| 2020/0134298 A1* | 4/2020 | Zavesky | H04N 7/157 |
| 2020/0213367 A1 | 7/2020 | Chiang et al. | |
| 2023/0024999 A1* | 1/2023 | Wu | H04L 63/20 |

FOREIGN PATENT DOCUMENTS

| | | |
|---|---|---|
| KR | 10-2020-0072321 A | 6/2020 |
| KR | 10-2020-0073784 A | 6/2020 |

OTHER PUBLICATIONS

Extended European Search Report dated Oct. 30, 2023, issued in European Patent Application No. 21846661.3.

* cited by examiner

FIG. 1A
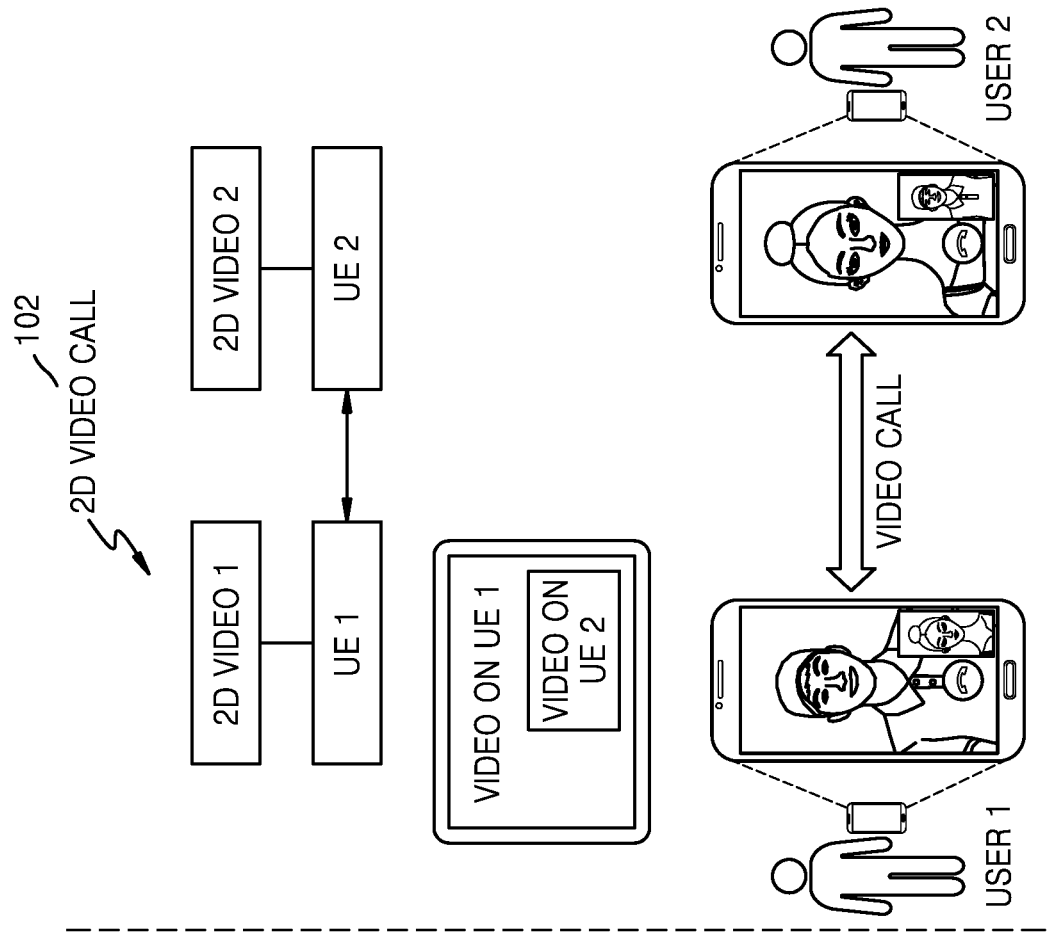
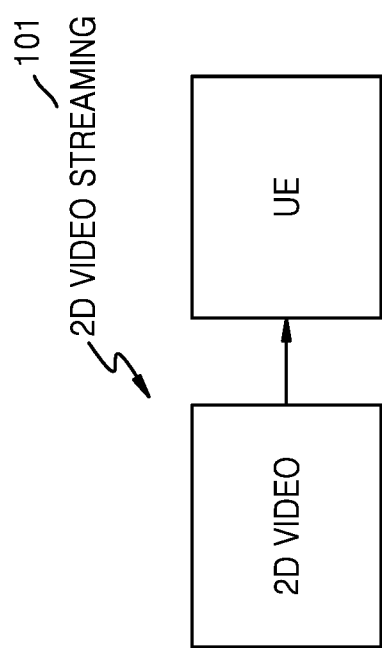

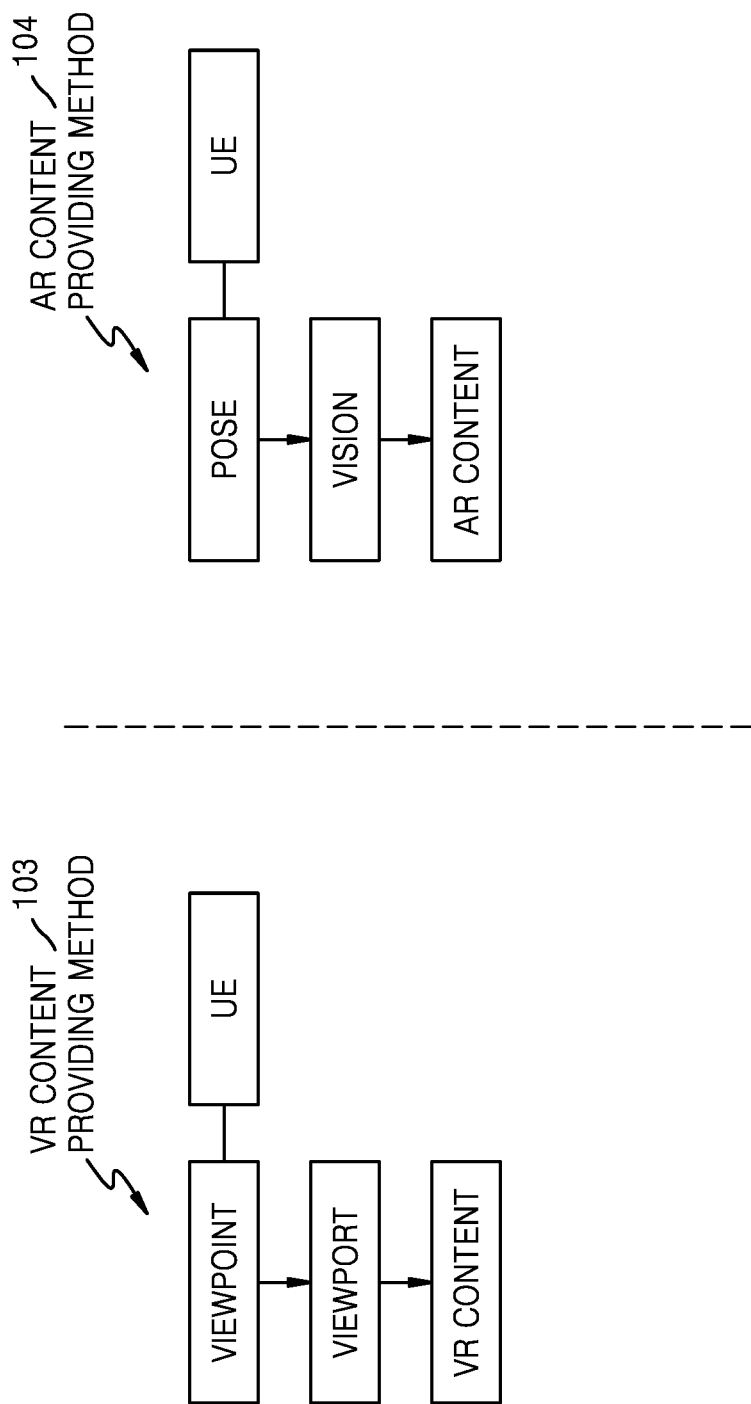

METHOD AND APPARATUS FOR TRANSMITTING 3D XR MEDIA DATA

CROSS-REFERENCE TO RELATED APPLICATION(S)

This application is based on and claims priority under 35 U.S.C. § 119(a) of a Korean patent application number 10-2020-0091697, filed on Jul. 23, 2020, in the Korean Intellectual Property Office, the disclosure of which is incorporated by reference herein in its entirety.

BACKGROUND

1. Field

The disclosure relates to a method and apparatus for providing a user with an extended reality (XR) experience. More particularly, the disclosure relates to a method and apparatus for transmitting three-dimensional (3D) XR media data to another device.

2. Description of Related Art

With recent advances in communication technology and image processing technology, services, which provide an extended reality (XR) experience to a user by using various devices such as a wearable device or a mobile device, have emerged. XR or an XR service is a collective term encompassing virtual reality (VR), augmented reality (AR), mixed reality (MR), etc., and refers to a service that allows a user to experience a virtual environment or object virtually generated by a computing device as if the virtual environment or object were real or mixed with the real world by providing the virtual environment or object to the user independently or together with a real-world environment or object.

As a method of providing an XR service, a method of providing two-dimensional (2D) media content to a user via a display device is used. A method of providing 2D media content to a user via a display device includes capturing, encoding, decoding, and rendering of a 2D object.

Moreover, with the introduction of 3D media content that may be represented using a point cloud or a mesh, the possibility of services for providing 3D XR media content to users using various devices has emerged. A device for providing 3D XR media content is not limited to a 2D display device, and various display devices such as a head mounted display (HMD) or AR glasses may be used. However, a procedure for capturing, encoding, decoding, and rendering a 3D object may be different from a procedure related to a 2D object. For example, a procedure for processing a 3D object may be more complex than a procedure of processing a 2D object, and the procedure for processing a 2D object may require little or no pre-processing of data in a capturing or encoding operation. On the other hand, in order to process a 3D object, preprocessing of data may be required, and additional metadata and sufficiently high signaling, processing, presentation or displaying performance, etc. may be required compared to processing of a 2D object.

Thus, there is a need to establish a method and a procedure for providing 3D XR media content to a user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for transmitting three-dimensional (3D) extended reality (XR) media data to another device.

Additional aspects will be set forth in part in the description which follows and, in part, will be apparent from the description, or may be learned by practice of the presented embodiments.

In accordance with an aspect of the disclosure, a method performed by a first terminal in a wireless communication system is provided. The method includes identifying capabilities of the first terminal connected to at least one component device, establishing, via a server, a session associated with an augmented reality (AR) service based on the capabilities of the first terminal, performing pre-processing on 3 dimensional (3D) media data acquired by the at least one component device, and transmitting, to a second terminal, the pre-processed 3D media data.

In accordance with another aspect of the disclosure, a method performed by a second terminal in a wireless communication system is provided. The method includes identifying capabilities of the second terminal connected to at least one component device, establishing, via a server, a session associated with an augmented reality (AR) service based on the capabilities of the second terminal, receiving, from a first terminal, 3 dimensional (3D) media data, performing post-processing on the 3D media data, and rendering the post-processed 3D media data on the second terminal.

In accordance with another aspect of the disclosure, a first terminal in a wireless communication system is provided. The first terminal includes a transceiver, and at least one processor configured to identify capabilities of the first terminal connected to at least one component device, establish, via a server, a session associated with an augmented reality (AR) service based on the capabilities of the first terminal, perform pre-processing on 3 dimensional (3D) media data acquired via the at least one component device, and transmit, to a second terminal via the transceiver, the pre-processed 3D media data.

In accordance with another aspect of the disclosure, a second terminal in a wireless communication system is provided. The second terminal includes a transceiver, and at least one processor configured to identify capabilities of the second terminal connected to at least one component device, establish, via a server, a session associated with an augmented reality (AR) service based on the capabilities of the second terminal, receive, from a first terminal via the transceiver, 3 dimensional (3D) media data, perform post-processing on the 3D media data, and render the post-processed 3D media data on the second terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A is a diagram for describing two-dimensional (2D) video streaming and a 2D video call according to an embodiment of the disclosure;

FIG. 1B is a diagram for describing a method of providing virtual reality (VR) content and a method of providing augmented reality (AR) content, according to an embodiment of the disclosure;

Throughout the drawings, it should be noted that like reference numbers are used to depict the same or similar elements, features, and structures.

DETAILED DESCRIPTION

Figure 2A:
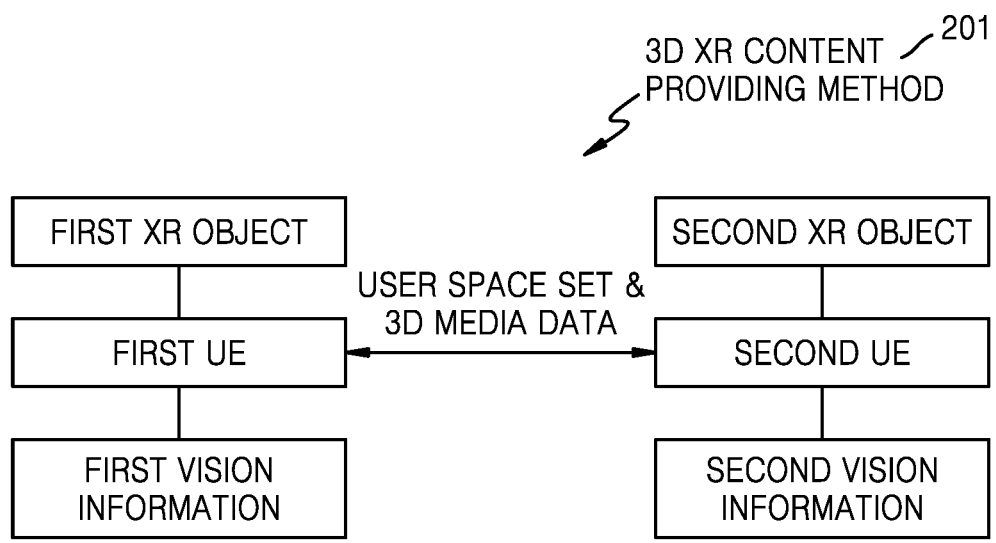
FIG. 2A is a diagram for describing a method, performed by a first user equipment (UE), of providing or receiving three-dimensional (3D) extended reality (XR) media content to or from a second UE, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some components are exaggerated, omitted, or schematically illustrated. Furthermore, the size of each element does not entirely reflect an actual size thereof. In the drawings, like reference numerals refer to the same or corresponding elements throughout.

Advantages and features of the disclosure and methods of accomplishing the same will be more readily appreciated by referring to the following description of embodiments and the accompanying drawings. However, the disclosure may be embodied in many different forms and should not be construed as being limited to the embodiments set forth below. Rather, the embodiments are provided so that the disclosure will be made thorough and complete and will fully convey the concept of the disclosure to those of ordinary skill in the art to which the disclosure pertains, and the disclosure will only be defined by the appended claims. Throughout the specification, like reference numerals refer to like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of the flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed by the processor of the computer or another programmable data processing equipment create a unit for performing functions specified in the flowchart block(s). The computer program instructions may also be stored in a computer-executable or computer-readable memory capable of directing a computer or another programmable data processing equipment to implement functions in a specific manner, and thus, the instructions stored in the computer-executable or computer-readable memory are capable of producing items including instruction means for performing the functions described in the flowchart block(s). The computer program instructions may also be loaded into a computer or another programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It should also be noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term "unit" denotes a software element or a hardware element such as a field-programmable gate array (FPGA) or an application-specific integrated circuit (ASIC), and performs certain functions. However, the term "unit" is not limited to software or hardware. The 'unit' may be configured to be in an addressable storage medium or configured to operate one or more processors. Thus, the term 'unit' may include, for example, elements such as software elements, object-oriented software elements, class elements, and task elements, processes, functions, attributes, procedures, subroutines, segments of program code, drivers, firmware, micro-codes, circuits, data, a database, data structures, tables, arrays, and variables. Functions provided by the elements and "units" may be combined into a smaller number of elements and "units", or may be further divided into additional elements and "units". Furthermore, the elements and "units" may be embodied to reproduce one or more central processing units (CPUs) in a device or security multimedia card. In addition, in an embodiment of the disclosure, the "unit" may include one or more processors.

The disclosure may be applied to various devices and XR services. For example, the disclosure may be applied to fields such as augmented reality (AR), AR wearable devices (e.g., AR glasses, a head mounted display (HMD), etc.), mobile AR wearable devices, standalone AR wearable devices, three-dimensional (3D) object modeling, 3D teleconferencing, session setup and establishment for an XR service, cloud assisted session management for providing an XR service, virtual reality monitor (VRM) mobile VR, TV VR, etc. The fields of extended reality (XR) to which the disclosure may be applied may be variously determined without being limited to the above examples.

In the disclosure, the term XR is a term including at least one of VR, AR, or mixed reality (MR). For example, AR glasses, AR objects, and VR services may be respectively referred to as XR glasses, XR objects, and XR services.

In the disclosure, XR media content may include various types of media content. For example, XR media content may include 360-degree video content and 3D object based media content (a point cloud and a mesh). In the disclosure, unless otherwise described, XR media, XR media content, XR content, XR services, etc. pertain to 3D content.

In the disclosure, a "user's device" refers to one or more devices that are located around a user and obtain, process, or transmit or receive data to provide XR services to the user.

In the disclosure, an "XR device" refers to a device that includes a display and provides XR content to a user via the display. The shape and properties of a display of an XR device may be variously determined. For example, the display may be transparent, semi-transparent, or opaque, and may be a flexible display, a foldable display, or a rigid display with display elements being organic light-emitting diodes (OLEDs), LEDs, liquid crystals (LCs), or the like. The shape and properties of the display of the XR device may be variously determined without being limited to the above examples. Furthermore, the XR device may be a wearable device (e.g., a HMD, XR glasses, etc.) that a user is able to wear.

In the disclosure, a "component device" refers to a device that performs at least one of "rendering", "vision", or "capturing" function to provide an XR service. A component device may be a collective term referring to a rendering device, a vision device, and a capturing device. Each of the functions will be described in detail below with reference to FIG. 4. A component device may be an independent device or a device block included in another device.

Any one or more of various communication technologies may be used as a communication technology that may be used for communication between component devices and communication between a component device and a UE. For example, device-to-device (D2D) communication technologies such as Wi-Fi, Wi-Fi Direct, D2D communication, 5G sidelink, Bluetooth, tethering, and other short-range communication technologies may be used. Communication technologies that may be used for communication between component devices and communication between a component device and a UE may be variously determined without being limited to the above-described examples.

In the disclosure, a "UE" refers to a device having a network capability (e.g., a $5^{th}$ generation (5G) modem capability) to transmit or receive data to or from another user's device via a network. For example, the UE may communicate with another UE via a server, and may include a communication module or communication application for communicating with the server or the other UE.

As a communication technology available for use in communication between UEs, any one or more of various communication technologies may be used. For example, a UE may communicate with other UEs by using a communication technology that is compliant with the $3^{rd}$ Generation Partnership Project (3GPP) standards, such as long-term evolution (LTE) or 5G, or a communication technology such as Wi-Fi. A communication technology that may be used for communication between UEs may be variously determined without being limited to the above-described examples.

In the disclosure, device names such as "XR device", "component device", and "UE" are used to logically classify a user's device according to its function. Thus, a device may be referred to by one or more device names. For example, when a first device includes a display and is capable of displaying XR content to a first user, transmitting or receiving data to or from a UE of a second user, and capturing an object via a built-in camera, the first device may be referred to as any one of an XR device, a capturing device (component device), or a UE according to circumstances.

A method of providing 3D XR media content proposed by the disclosure includes the following:
    End to end (E2E) flow and architecture for XR services
        The E2E flow and architecture for XR services may include distribution of media processing across services among multiple devices, and may be composed of processing entities within a cloud (one or more cloud servers, edge clouds, mobile edge computing (MEC) servers, etc.).
    A functional component architecture of a terminal or UE for XR services
    A UE architecture that supports a configuration including a plurality of devices (hereinafter, referred to as a multi-device configuration) For example, the plurality of devices may be connected (or tethered) to one another via wired tethering, wireless tethering, or other wired/wireless networks. In addition, the multi-device configuration may include a standalone wearable device (e.g., a HMD, XR glasses, etc.).

UE session setup and establishment procedures for various XR services on various devices Necessary information for enabling use cases of XR conversational services (e.g., device pose information, reference points, functionality types of a device (e.g., vision, capture, etc.) and media properties (e.g., object size, etc.)

Definition of UE features and capabilities used to determine session establishment Determination of cloud assistance based on services, UE capabilities, and requirements (according to a UE or service management entity)

However, the above description is merely for convenience of understanding, and embodiments presented in the disclosure will be described throughout the disclosure. Hereinafter, a method and apparatus according to the disclosure will be described with reference to the attached drawings.

FIG. 1A is a diagram for describing two-dimensional (2D) video streaming 101 and a 2D video call according to an embodiment of the disclosure.

Referring to FIG. 1A, in the 2D video streaming 101, 2D video content may be directly transmitted to a UE. The 2D video call 102 is a service in which images (or an image) of a first user and/or a second user are displayed as 2D video images on a 2D display of each of first and second UEs when the first user using the first UE makes or receives a video call with the second user using the second UE. In the 2D video call 102, the 2D video image of the first user of the first UE and the 2D video image of the second user of the second UE are simply overlaid on each other in the display of each of the first and second UEs, but the two video images may not be correlated with each other.

FIG. 1B is a diagram for describing a VR content providing method 103 and an AR content providing method 104, according to an embodiment of the disclosure.

Referring to FIG. 1B, in the VR content providing method 103, a viewport may be created based on a viewpoint of a UE, and VR content may be generated based on the viewport. A viewport refers to a polygon representing a spatial region, and an object may be rendered inside the viewport. In other words, in the VR content providing method 103, only an object included in an area viewed by the UE from a viewpoint of the UE may be generated as VR content. The generated VR content may be displayed on a display of the UE or transmitted to another UE.

In the AR content providing method 104, vision information may be generated based on a pose of the UE, and AR content may be generated based on the vision information. The vision information is information about the surrounding environment of the UE. In other words, in the AR content providing method 104, vision information including information about a position and a direction where a first UE is located with respect to the surrounding environment of the first UE may be generated based on a pose of the first UE, and an image of the first UE or an image of an object surrounding the first UE may be provided to a second UE by taking into account the surrounding environment of the first UE. For example, when the first UE lies on a sofa, the second UE may display an image of the first UE lying on the sofa or on any object. In other words, in the AR content providing method 104, it may be determined, based on the vision information, where an object existing in the surrounding environment of the first UE is to be displayed on a display of a second UE (where the object will be augmented).

In contrast to a use case of 2D media content, the disclosure provides a method for enabling 360-degree video and 3D media related services for XR applications. The 360-degree video and 3D media related services of the disclosure may include XR conversational services. The XR conversational services are services in which AR objects, VR objects, or the like generated in advance or in real-time during a real-time conversation (e.g., a call) between users using XR devices are provided to a user in real-time. For XR conversational services, additional pre/post-processing may be required in end-to-end (E2E) flow to support VR or AR applications. Furthermore, additional information related to configurations and settings of devices that may be used in use cases for XR conversational services may be required for correct rendering and display of objects.

For example, requirements for metadata and additional pre-processing and post-processing may be determined depending on the following factors.

Application programs and use cases (from a user's perspective)

Combinations and form factors of various devices that may be used in a use case (both from a user's perspective and a system perspective)

Media coordination that may be needed due to E2E constraints or bottlenecks in a service chain (e.g., constraints on a network bandwidth or processing/functionalities of a device)

In order to support real-time services enabled through 360-degree video and 3D media (e.g., services, such as XR conversational services, in which content is captured and processed in real-time and delivered in real-time to a network processing entity or another user), metadata (e.g., a pose, a camera type, etc.) may be required for processing and display of the 360-degree video and 3D media. In addition, there may be a need to optimize processing operations related to metadata across the entire E2E flow so that requirements of devices, services and networks are all met.

According to an embodiment of the disclosure, a UE architecture for XR services is defined. The UE architecture of the disclosure may enable various services (e.g., AR conversational services) having various requirements (media type, media quality, latency, etc.) under various network capabilities and environments (e.g., variable network bandwidths, MEC/cloud processing capabilities, etc.) across different device configurations (or settings) and different capabilities (capture, vision, rendering, display and processing capabilities, and processing speed/power).

FIG. 2A is a diagram for describing a method, performed by a first UE, of providing or receiving 3D XR media content to or from a second UE, according to an embodiment of the disclosure.

Referring to FIG. 2A, information related to a UE includes vision information indicating a surrounding environment of the UE and information about an XR object included in the surrounding environment of the UE. In order for the second UE to provide a first XR object included in the surrounding environment of the first UE to user of the second UE as 3D XR media content, information about the first XR object and first vision information about the surrounding environment of the first UE may be required. The first vision information may be used by the second UE to determine where to display the first XR object.

In a 3D XR content providing method 201 according to an embodiment of the disclosure, the first UE may provide first space set information of the first UE to the second UE so that the second UE may obtain the first XR object and the first vision information and display the first XR object thereon.

The first space set information is information about a space surrounding the first UE, and the second UE may use the first space set information to recognize the surrounding environment of the first UE and display the first XR object. In addition, the second UE may further use second space set information of the second UE to display the first XR object by taking into account both the surrounding environments of the first and second UEs. Similarly, the first UE may receive the second space set information from the second UE, and display a second XR object based on second vision information. Alternatively, some or all of the vision information may not be shared between UEs, and each UE may display an XR object based on received space set information. The space set information will be described in detail below with reference to FIG. 6.

Figure 2B:
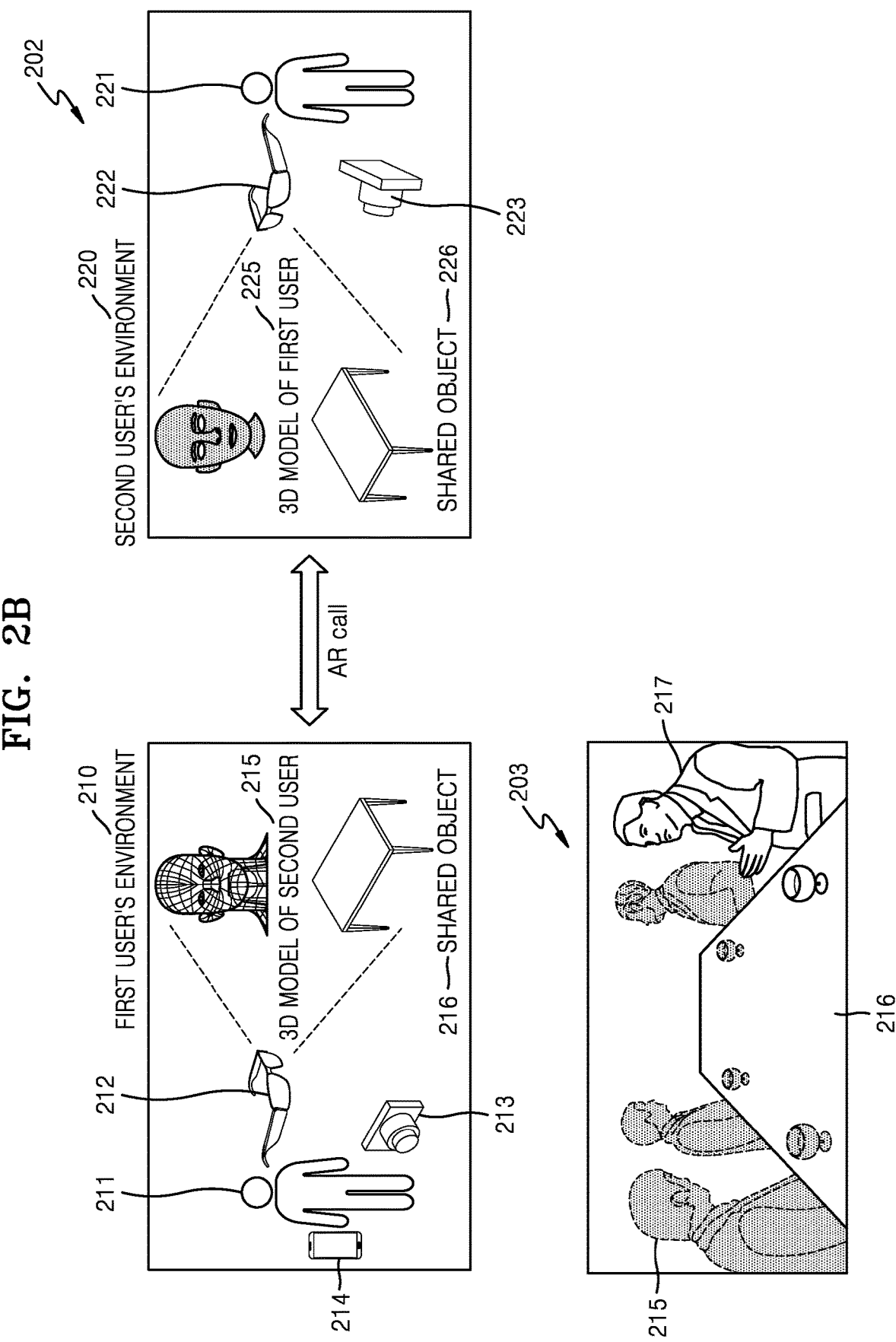
FIG. 2B is a diagram for describing a method, performed by a first user, of sharing XR media content with a second user, according to an embodiment of the disclosure.

FIG. 2B is a diagram for describing a method, performed by a first user 211, of sharing XR media content with a second user 221, according to an embodiment of the disclosure. The embodiment of the disclosure to be described with reference to FIG. 2B is merely an example, and a method of providing 3D XR media content according to the disclosure is not limited to the embodiment of the disclosure illustrated in FIG. 2B. FIG. 2B shows an example in which XR glasses are used as an XR device. The XR glasses may be transparent, semi-transparent, or opaque. Except when the XR glasses are opaque, a user of the XR glasses may see objects actually existing in a user's field of view (FOV) directly through the lenses, and additionally see 3D media object displayed by the XR glasses.

Referring to FIG. 2B, 202 of FIG. 2B illustrates a situation where an XR call (or AR call) is performed between the first and second users 211 and 221. The XR call may be initiated by a call request and a call response between first and second UEs 214 and 222. The first user 211 may see a 3D video object 215 representing the second user 221 and a shared object 216 via first XR glasses 212, while the second user 221 may see a 3D video object 225 representing the first user 211 and a shared object 226 via second XR glasses (or the second UE) 222.

The first XR glasses 212, a first camera 213, and the first UE 214 may exist around the first user 211 as devices for XR services. The first XR glasses 212 may render an XR object to be displayed on a display thereof. In addition, the first XR glasses 212 may include a vision camera, and may capture the surrounding environment 210 of the first user 211 by using the vision camera. The first camera 213 may capture an image of the first user 211 in real-time, and may be used to transmit a real-time 3D image of the first user 211 to the second user 221. The first UE 214 may control the XR call with the second UE 222, receive and process data from the second UE 222 for transmission to the first XR glasses 212, and receive and process images captured from the first XR glasses 212 and the first camera 213 for transmission to the second UE 222. Similarly, the second XR glasses (or the second UE) 222 and a second camera 223 may exist around the second user 221 as devices for XR services within the second user's environment 220. Such a configuration is different from a configuration of devices surrounding the first user 211 in that the second XR glasses also serve as the second UE 222 capable of transmitting and receiving data to and from the first UE 214 and managing and processing various pieces of data.

The shared object 216 or 226 may be an object that actually exists in the surroundings of the first or second user 211 or 221 or an object that is created virtually or shared by the first or second user 211 or 221. In addition, the first or second user 211 or 221 is capable of manipulating (or interacting with) the shared object 216 or 226. For example, the second user 221 may move or rotate the shared object 226 displayed on the second XR glasses (or the second UE 222), and accordingly, the shared object 216 may also be moved or rotated in the display of the first XR glasses 212.

In the situation where the XR call is performed as shown in 202 and 203 of FIG. 2B, the following features may exist. At least some of the following features may be different from those of the 2D video call of FIG. 1A.

One or more 3D media objects may be delivered (and/or shared) between two users. Objects may be captured in real-time or pre-captured prior to an AR call.

A user may see a 3D media object via an XR device.

When rendered on an XR device, 3D media objects may be realistically augmented to a user's environment or background.

User interaction such as rotation and placement of 3D media objects by the user in the user's environment is possible.

A 3D media object may be pre-made and shared between users on the call (e.g., like the shared object 216) or captured and delivered in a real-time live manner (e.g., like a 3D video object representing the first or second user 211 or 221).

A user's UE may consist of one or more hardware devices with different processing functions and capabilities, or may be connected to the one or more hardware devices. For example, one or more hardware devices may include a capturing camera, a vision camera, rendering XR glasses, a mobile device that performs certain processing and has 5G capabilities, etc.

One or more hardware devices may be at different locations in the user's environment, and the locations of the hardware devices may be static or dynamic Media processing required for services may be distributed among other devices and entities (e.g., cloud and MEC servers, etc.) within an E2E flow.

According to an embodiment of the disclosure, in order to augment and display a 3D media object in the user's environment, XR glasses, a UE, and a camera may exchange information with one another. The second UE 222 may obtain, via the second camera 223, information about the second user 221, information for generating a second space set, and information about an object (e.g., the second user 221) existing in the second space set. The first UE 214 may receive, from the second UE 222, information about the second space set around the second UE 222 and information about the second user 221. The first UE 214 may transmit the information received from the second UE 222 to the first XR glasses 212 after or without processing the received information. The first XR glasses 212 may augment and display a 3D media object for the second user 221 and the shared object 216 in an environment of the first user 211 by using a display based on the received information. In order for the first XR glasses 212 to augment and display the 3D media object, information about the surroundings of the first user 211 obtained from the first camera 213 may be further used. In the same manner, a second XR device may augment and display the first user 211 and the shared object 226 in the environment of the second user 221.

Reference numeral 203 of FIG. 2B represents a field of view of the first user 211 wearing the first XR glasses 212. A desk that is the shared object 216 and the 3D video object 215 representing the second user 221 may be displayed on the display of the first XR glasses 212. Furthermore, an XR call may be made among three or more users. For example, referring to 203 of FIG. 2B, a total of five users including the first user 211 participate in an XR call, and the second user 221, a third user, and a fourth user are displayed on the first XR glasses 212. Because the desk that is the shared object 216 and a fifth user 217 actually exist in the surroundings of the first user 211, the desk and the fifth user 217 may be directly visible to the first user 211 without being separately displayed on the transparent or semi-transparent display of the first XR glasses 212.

Figure 3:
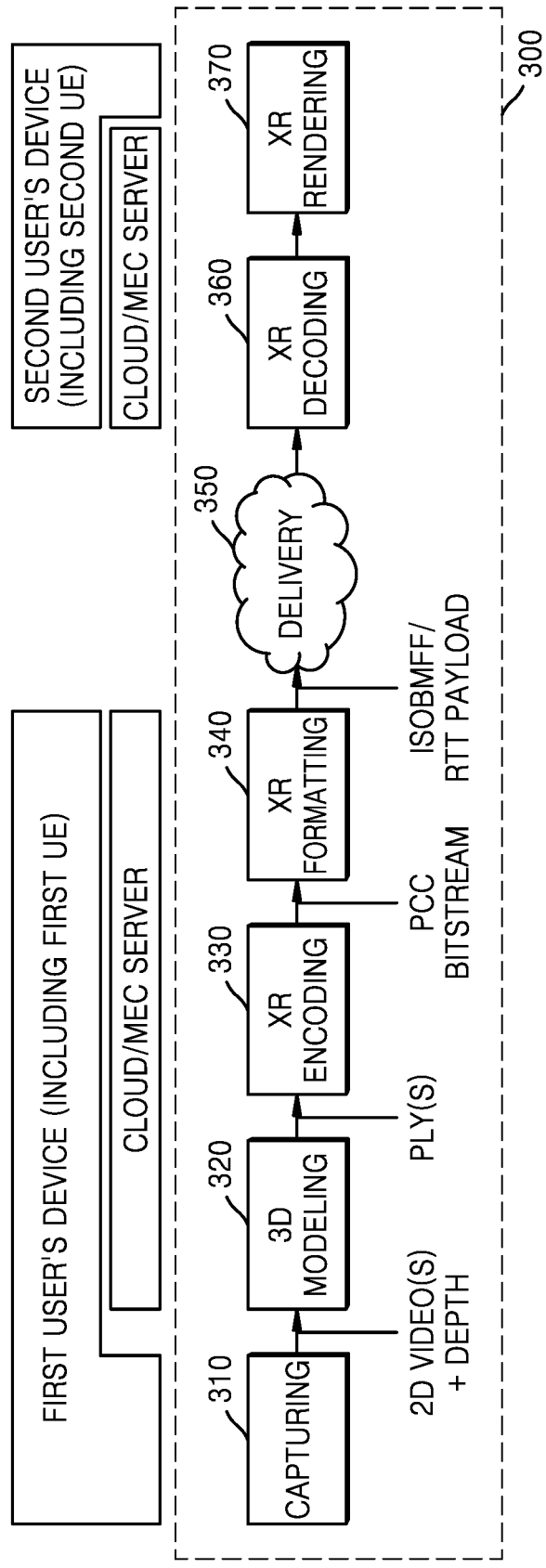
FIG. 3 is a diagram for describing an XR service flow in which an object existing in a first user's environment is provided to a second user as a 3D media object, according to an embodiment of the disclosure.
Figure 4:
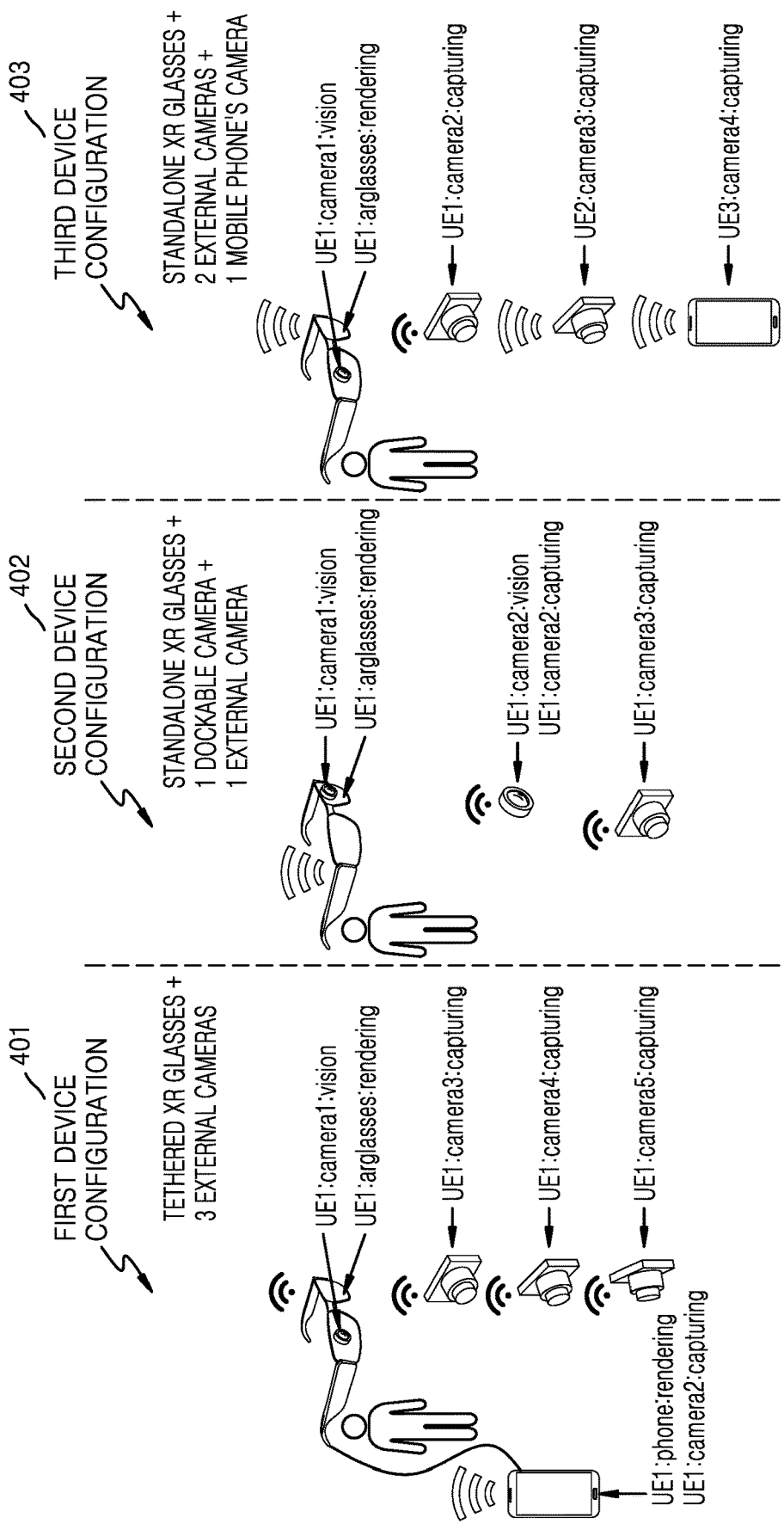
FIG. 4 is a diagram for describing various device configurations that may be used to provide 3D XR media, according to an embodiment of the disclosure.
Figure 5:
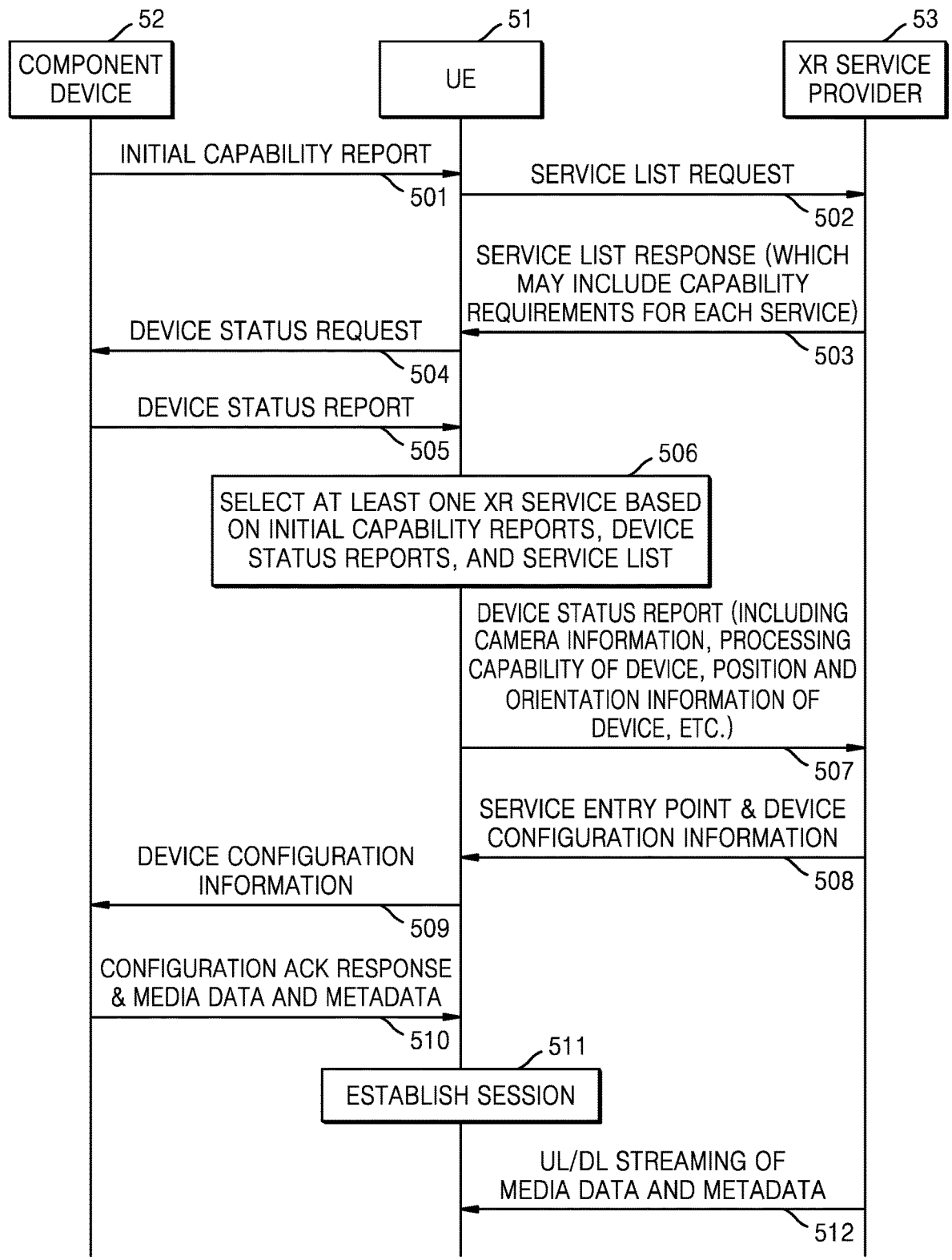
FIG. 5 is a diagram for describing a process by which an XR service session is established and an XR service is provided, according to an embodiment of the disclosure.
Figure 6:
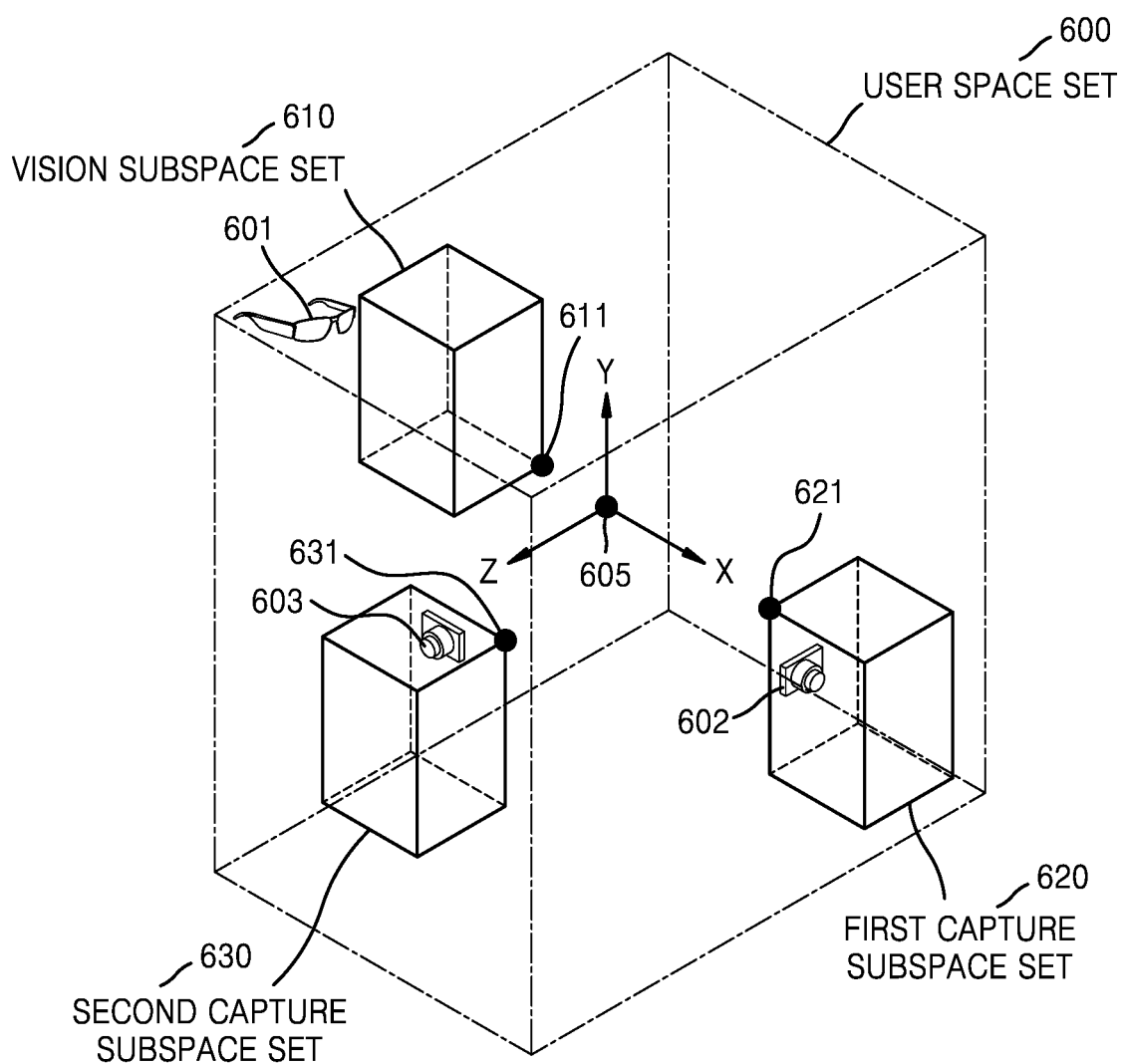
FIG. 6 is a diagram for describing a user space set according to an embodiment of the disclosure.
Figure 7:
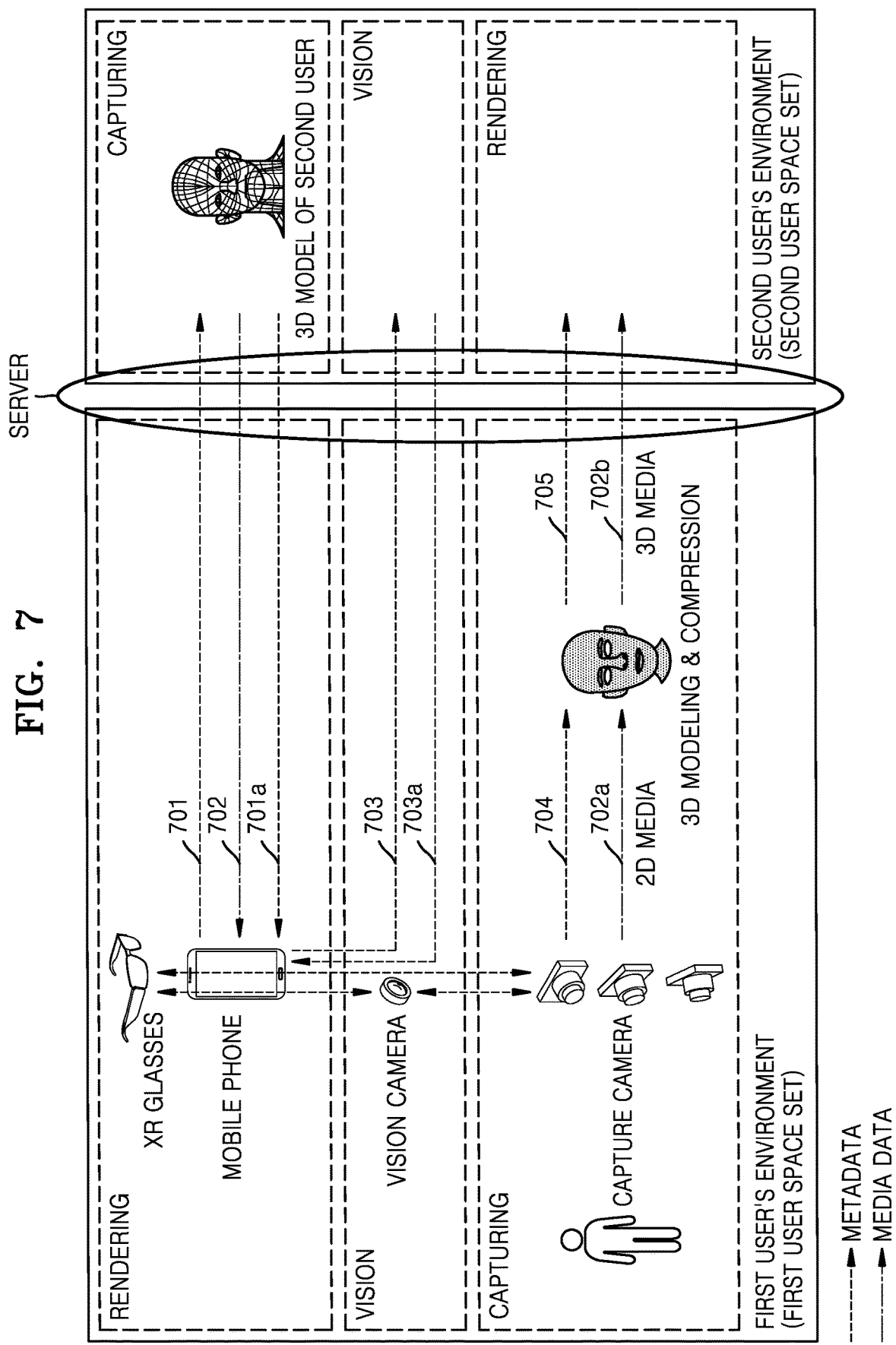
FIG. 7 is a diagram for describing a flow of media data and metadata, according to an embodiment of the disclosure.
Figure 8:
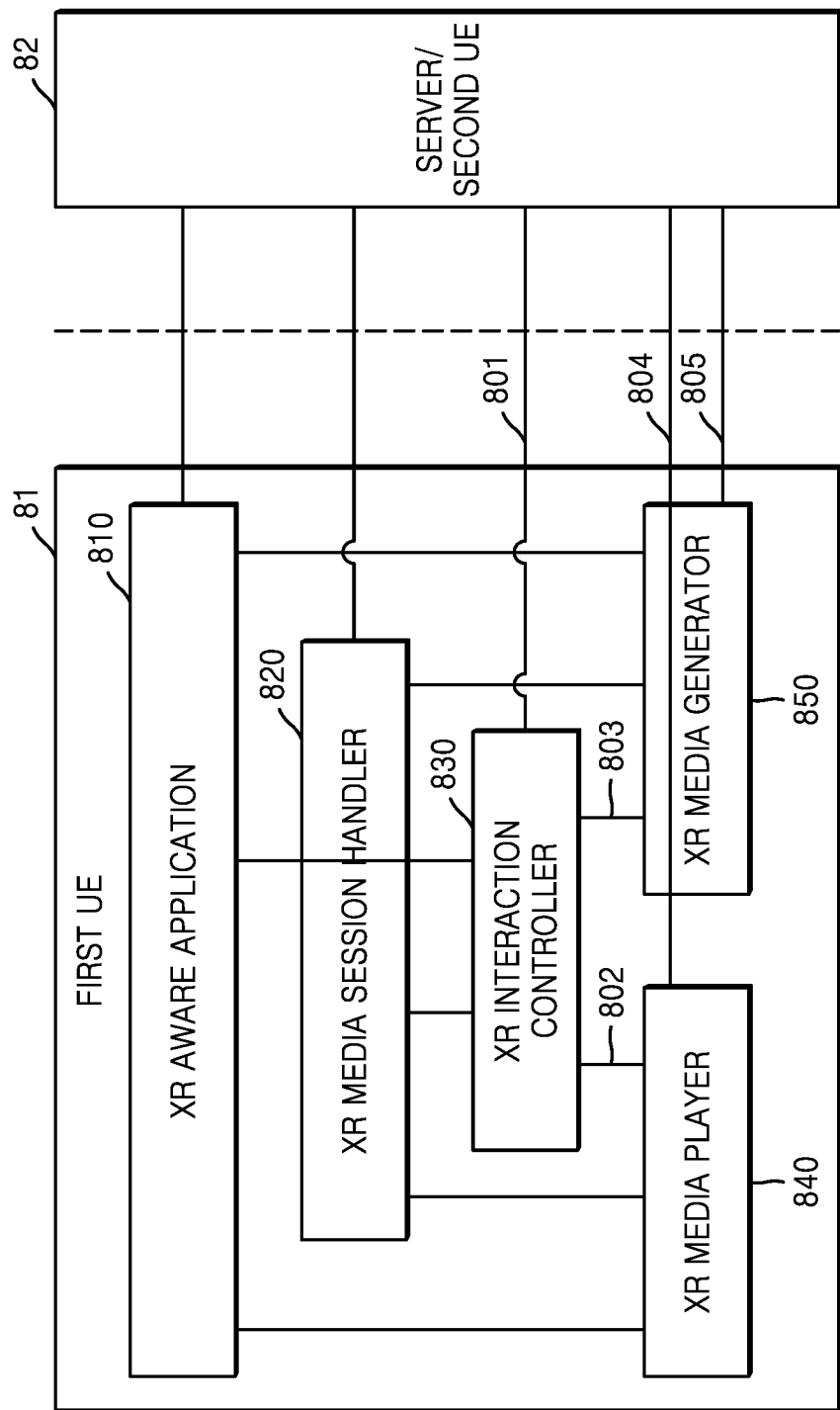
FIG. 8 is a diagram for describing an XR media architecture of a UE, according to an embodiment of the disclosure.
Figure 9:
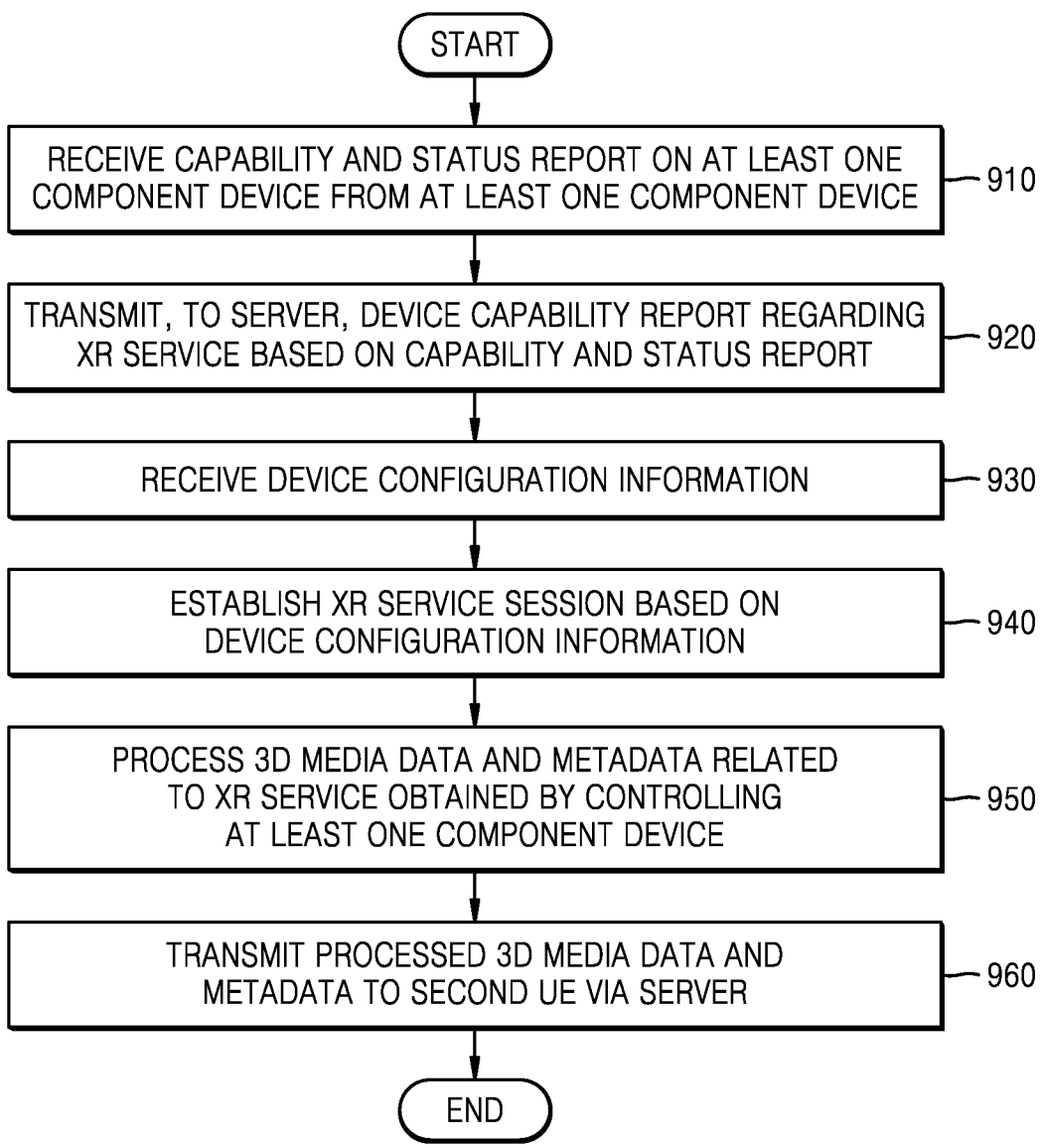
FIG. 9 is a diagram for describing a method, performed by a first UE, of transmitting 3D XR media data to a second UE, according to an embodiment of the disclosure.
Figure 10:
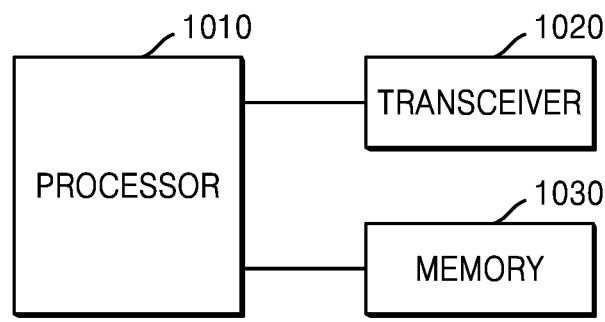
FIG. 10 is a diagram for describing a configuration of a UE or component device according to an embodiment of the disclosure.
Figure 11:
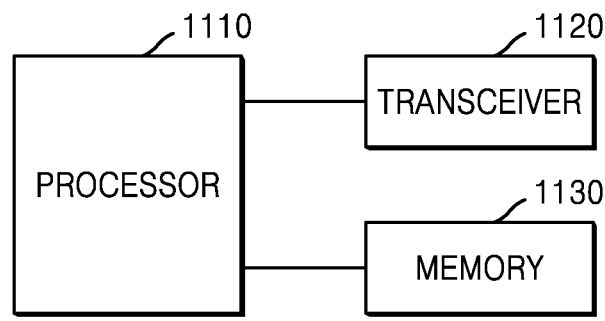
FIG. 11 is a diagram for describing a configuration of a server according to an embodiment of the disclosure.

Hereinafter, a 3D XR media content providing method according to the disclosure for providing various 3D XR services such as the XR call described with reference to FIG. 2B will be described with reference to FIGS. 3 through 11. FIG. 3 is a diagram for describing a media flow for providing XR services, and FIG. 4 illustrates various device configurations used to provide XR services. FIG. 5 illustrates an XR service session establishment for providing XR services, and FIG. 6 illustrates a user space set and user space set parameters used for providing XR services. FIG. 7 illustrates a flow of media data and metadata in an XR service session, FIG. 8 illustrates a XR media architecture of a UE for providing XR services, and FIG. 9 is a flowchart of an XR service providing method. FIGS. 10 and 11 illustrate configurations of devices for providing XR services.

FIG. 3 is a diagram for describing an XR service flow in which an object (hereinafter, referred to as a 'first object') existing in an environment of a first user is provided to a second user as a 3D media object, according to an embodiment of the disclosure.

Referring to FIG. 3, the first object may be provided to a second user through 3D media processes 300. The 3D media processes 300 may be performed by a first user's device including a first UE and a second user's device including a second UE, and some of the 3D media processes 300 may be performed by a cloud or MEC server. For example, capturing 310 may be performed by the first user's device, and at least some of 3D modeling 320, XR encoding 330, and XR formatting 340 may be performed by the first user's device or a cloud or MEC server. At least one of XR decoding 360 or XR rendering 370 may be performed by the second user's device or a cloud or MEC server. Thus, management of an XR service session may be required in order to distribute service processing between entities, i.e., determine, in a distributed manner, which of the entities is to perform a certain process among the 3D media processes 300. For example, a UE may determine to request a cloud or MEC server to perform processing (i.e., cloud-assisted processing) for at least some of the 3D media processes 300, based on at least one of a capability of a component device, a capability of the UE, or a capability of an XR device. Furthermore, the cloud or MEC server may receive a device capability report from the UE, and determine whether to perform cloud-assisted processing for at least some of the 3D media processes 300, based on at least one of the capability of the component device, the capability of the UE, or the capability of the XR device. Criteria for evaluating the capability of the user's device may include a storage capacity of the device, the number of processible operations per second, the number of clocks of a processing device, or information about whether hardware equipment specialized for particular processing is included. The criteria for evaluating the capability of the user's device may be variously determined without being limited to the above-described examples.

An example of detailed operations in the 3D media processes 300 is as follows.

Capturing (or capture) 310: An operation of capturing content (e.g., a scene, an object, a combination of both, or the like depending on a service application) in real-time via one or more cameras. The one or more cameras may include not only an RGB camera (outputting a 2D video) but also a camera capable of capturing a depth property and other properties such as reflectance that may be used to capture data (e.g., a depth map) needed for 3D modeling. Properties that are capturable by a camera are not limited to the above-described examples and may include various other properties. In addition, processing of data captured by a camera may require, in addition to the captured data, other data (e.g., intrinsic and extrinsic parameters of the camera) that may be obtained during the capture.

3D modeling 320: Data output in the capturing 310 may be used for performing 3D modeling to generate and output content in the form of a 3D model data bit stream. A 3D model data bit stream, such as polygon file format (PLY) data, may represent 3D media data in the form of a point cloud or a mesh. For example, data output in the capturing 310 may be processed as PLY data as follows.

multiple RGB+depth→a single PLY representing one object multiple RGB+depth→a plurality of PLYs (a plurality of object sub-parts)→A single PLY representing one object XR encoding 330: An output in the 3D modeling 320 may be encoded to compress large amounts of raw data. Point cloud encoding or mesh encoding may be performed using various encoding techniques (e.g., moving pictures expert group (MPEG) video based point cloud compression (V-PCC), Google Draco, etc.). The encoding may be lossy encoding or lossless encoding. To support decoding of compressed data, a decoder corresponding to an encoder used in the XR encoding 330 may have to be used.

XR formatting (or format) 340: For transmission of data over a network such as a 5G network, the compressed data output in the process of XR encoding 330 may need to be formatted and/or encapsulated. For example, an MPEG international organization for standardization base file format (ISOBMFF) for file encapsulation, an MPEG media transport protocol (MMTP) payload format, a real-time transport protocol (RTP) payload format for preparation before delivery of data, or the like may be used as a format technology.

Delivery 350: Compressed and formatted media may be delivered to the second UE over a 5G network, etc. by using hypertext transfer protocol (HTTP), RTP, MPEG dynamic adaptive streaming over HTTP (DASH), MPEG media transport (MMT), or other delivery mechanisms.

XR decoding 360: The compressed data may be received by an XR decoding entity, and the XR decoding entity may decapsulate and decode the compressed bitstream to restore a PLY bitstream that has not been compressed.

XR rendering 370: After the XR decoding 360, the 3D data bitstream may be transmitted to a renderer. The renderer may render a 2D viewport of the 3D data according to intent of the first user or the first UE, which is received from the first UE, or pose information of the second user using the second UE (e.g., a user offset position, a pose, an orientation, a view frustum, and a viewport). The intent of the first user or the first UE may be delivered to the second UE through, for example, some metadata.

The 3D media processes 300 illustrated in FIG. 3 are merely an example of an XR 3D service flow, and 3D media may be provided through media processes that are slightly different from the 3D media processes 300. In addition, the first and second UEs may each include one or more component devices or may be connected to one or more component devices. For example, one or more component devices may be connected or tethered to the first or second UE by using Bluetooth, Wi-Fi Direct, 5G sidelink, or other communication technologies.

FIG. 4 is a diagram for describing various device configurations that may be used to provide 3D XR media, according to an embodiment of the disclosure.

Before describing the device configurations, a syntax of each device according to an embodiment of the disclosure will be described. Each device may be specified using the following syntax or identifier.

UE ID, device description, and device functionality type description (UEx: device description:devicefunctionalitytypedescription)

Here, when each device has a network capability (hereinafter referred to as a data network capability) to transmit and receive data to and from another user's device, the corresponding device has a unique UE ID, or otherwise, a syntax for the corresponding device may include a UE ID of another device having a data network capability among devices connected to the device in a wired or wireless manner. For example, in a first device configuration 401 of FIG. 4, because only a mobile phone has a data network capability, UE IDs of all devices surrounding a user are "UE1" which is the UE ID of the mobile phone. On the other hand, in a third device configuration 403, because standalone XR glasses, a third camera, and a mobile phone each have data network capabilities, they may have "UE1", "UE2" and "UE3" as UE IDs, respectively. According to an embodiment of the disclosure, when the UE is capable of accessing a 5G system, at least one of a subscription permanent identifier (SUPI), a permanent equipment identifier (PEI), or a 5G global unique temporary identifier (5G-GUTI) may be used as the UE ID. In addition, a correlation between the UE ID and each of SUPI, PEI, and 5G-GUTI which are generated using separate algorithms, may be determined according to a preset algorithm, and the UE may be provided with the correlation. The correlation may be determined, for example, by the UE or a server, and may be provided to the UE or the server.

According to an embodiment of the disclosure, "device functionality type description" corresponding to a device may be classified based on a role in the device configuration and may be defined as follows.

Rendering: A device corresponding to a rendering functionality type may render an XR object on a display. The rendering device may render an XR object by using metadata/necessary information for functionality processing related to XR rendering. Functionality processing related to rendering may include, for example, 2D/3D media decoding, post-processing, presentation, and rendering to a 2D/3D display. Necessary information for XR rendering may include not only media data but also pose information of the rendering device itself Vision: A device corresponding to a vision functionality type may obtain and provide information about a user's surroundings (i.e., vision information) to enable accurate rendering of 2D or 3D media for XR services. For example, the vision device may obtain essential input data for computer vision processing such as simultaneous localization and mapping (SLAM) by using an RGB camera or other cameras, so that the user's surroundings may be recognized and analyzed. To realistically overlay an XR environment onto the user's environment, accurate analysis of the user's surroundings as well as 3D media objects may be required. Use cases in which the overlay is realistically represented may be, for example, placing a 3D media point cloud of a dog (a 3D media object) on a surface of a floor (the user's surroundings) or on a sofa in a user's living room (the user's surroundings).

Capturing: A device corresponding to a capturing functionality type may obtain and provide essential input data for capturing a 3D object in the user's environment (e.g., 3D models of the user's head, body, or other object).

FIG. 4 illustrates three device configurations capable of providing 3D media content to a user via XR devices according to an embodiment of the disclosure. Relative positions of various devices shown in FIG. 4 in relation to one another may be static or dynamic.

Referring to FIG. 4, the first device configuration 401 consists of XR glasses that are tethered to the mobile phone, a first camera included in the XR glasses, and three external cameras. A vision camera UE1:camera1:vision may be located on or inside the XR glasses (rendering device). Capturing cameras UE1:camera3:capturing, UE1:camera4:capturing, and UE1:camera5:capturing may be located outside the XR glasses to capture objects around the user. The mobile phone having a data network capability may be connected to the XR glasses in a wired manner or according to a wireless communication method (e.g., Bluetooth, tethering, etc.). In addition, the mobile phone may render an XR object on the mobile phone's display (and thus, may be identified as "UE1:phone:rendering") and capture objects around the mobile phone via its camera (and thus, may be identified as "UE1:camera2:capturing").

A second device configuration 402 consists of standalone XR glasses, a first camera included in the standalone XR glasses, a second camera that is dockable, and an external camera. Unlike in the first device configuration 401, the standalone XR glasses are referred to as such because they have a data network capability to transmit and receive data to and from another users' device without a separate mobile phone. The second camera that is dockable is a camera detachable from the standalone XR glasses. In other words, the first camera may be attached to or included in the standalone XR glasses as a component thereof, while the second camera may be attached to the standalone XR glasses or detached therefrom to be located at a different position. The first camera may perform a vision function, and the second camera may perform both a vision function and a capturing function.

The third device configuration 403 consists of the standalone XR glasses, two external cameras, and the mobile phone. The third device configuration 403 consists of a plurality of devices (the standalone XR glasses, the third camera, and the mobile phone) having data network capabilities. Thus, each of the devices having data network capabilities may transmit data related to XR services to a target destination (e.g., another user's device or server) via other devices or directly to the target destination without going through the other devices.

Moreover, FIG. 4 only illustrates three examples of various device configurations, and the disclosure is not limited to the examples of FIG. 4 and may include various other device configurations. For example, whether each device has a data network capability may be determined in various ways. Even when a first device has a data network capability, the first device may transmit data to a second device having a data network capability, and the second device may process the received data and transmit it to a server or another device. In addition, the number of devices that may be included in a device configuration is not limited to the examples of FIG. 4 and may be variously determined. Types of functionalities (capturing, vision, and rendering) that each device has may also be variously determined.

FIG. 5 is a diagram for describing a process by which an XR service session is established and an XR service is provided, according to an embodiment of the disclosure.

Referring to FIG. 5, a UE 51 may communicate with one or more component devices 52 and an XR service provider 53 belonging to an environment of a user of the UE. An XR service session may be established based on the communication among the UE, the one or more component devices, and the XR service provider. The user of the UE may transmit or receive XR 3D media content to or from a user of another UE in real-time by using the established XR service session. The XR service provider may include at least one server, and transmit XR service related data or metadata to the UE. For example, the XR service provider may include a cloud, an MEC server, etc.

In operation 501, each component device may transmit, to the UE, its device description as an initial capability report. The one or more component devices may include, for example, AR glasses, a camera, etc. The initial capability report may be transmitted to the UE when the corresponding component device is initially installed/connected to the UE.

In operation 502, the UE may request the XR service provider to transmit information associated with an XR service list. For example, a request for the XR service list may be initiated when the user of the UE requests an XR call from another user via the UE or receives an XR call request from another user. The UE may assume that the XR service may provide one or more representations of an object or scene according to device capabilities or network capabilities.

In operation 503, the XR service provider may provide the XR service list to the UE as a response. The XR service list may include capability requirements for each XR service. XR services that may be included in the XR service list may be variously determined. For example, the XR services may include an XR conference, an AR conference, a video call, etc. Furthermore, the XR services may include a plurality of services (e.g., a high-capability XR call service and a low-capability XR call service) having different capability requirements for the same type of service (e.g., an XR call). In addition, for a given XR service, the XR service provider may perform network media processing to support a UE having an insufficient processing capability. For example, the XR service provider may perform processing such as encoding or decoding of XR media data instead of the UE and transmit the resulting data to the UE. The XR service list may also include information about whether network-assisted media processing is available or required for each XR service.

In operation 504, the UE may request a device status report from each component device.

In operation 505, the corresponding component device may transmit a device status report to the UE. For example, the device status report may include the following device status information or device capability information:

A physical location and a facing direction of a device (e.g., a camera pose)

Hardware capabilities of the device (e.g., for a camera, a RGB resolution, a depth resolution, and an FOV; for XR glasses, encoder and decoder functions, a 3D modeling function, a display resolution, a display FOV, etc.)

In operation 506, the UE may select at least one XR service from the XR service list based on initial capability reports received in operation 501, the XR service list received in operation 503, and device status reports received in operation 505. The UE may collect device status reports received from the one or more component devices in operation 505, and select, from the XR service list, an XR service having capability requirements that match a status or capability of each component device.

In operation 507, the UE may determine, based on the initial capability report received in operation 501 and the device status report received in operation 505, capability information and status information of a corresponding component device related to the selected XR service, and transmit, to the XR service provider, the determined capability information and status information of the component device as a device capability report. The device capability report may include camera information, processing performance of the component device, position and orientation information of the component device, etc. According to an embodiment of the disclosure, the device capability report may include user space set parameters. The UE may determine the user space set parameters based on the initial capability report received in operation 501 and the device status report received in operation 505. A syntax and semantics for the user space set parameters will be described in detail below with reference to FIG. 6. Furthermore, the UE may determine to request the XR service provider to perform processing (i.e., network-assisted processing) for at least some processes from among 3D media processes related to the selected XR service, based on at least one of a capability of the corresponding component device, a capability of the UE, or a capability of an XR device. According to an embodiment of the disclosure, the device capability report may include information for requesting network-assisted processing for at least some of the 3D media processes related to the selected XR service.

In operation 508, the XR service provider may provide the UE with device configuration information and a service entry point (e.g., a manifest in the form of dynamic adaptive streaming over HTTP (DASH) media presentation description (MPD), etc.). The device configuration information may include operation-related configuration information (e.g., a display resolution, an uplink media profile, necessary metadata, etc.) of the component device related to the selected XR service. The service entry point may include identification information (e.g., address) of a data network that is accessible by the UE to receive the selected XR service. In addition, the XR service provider may determine to perform at least some of the 3D media processes related to the selected XR service, based on a UE's request or capabilities of the user's devices (the capability of the component device, the capability of the UE, or the capability of the XR device) included in the device capability report received in operation 507. According to an embodiment of the disclosure, the XR service provider may transmit, to the UE, information about which of the 3D media processes a network will support in operation 508.

In operation 509, the UE may transmit device configuration information to each component device.

Each component device may transmit a configuration acknowledgment (ACK) response to the UE (operation 510). The configuration ACK response may include details of a response indicating that the corresponding component device has configured or is able to configure itself according to the received device configuration information. In addition, the component device may transmit, to the UE, media data and metadata required for a session of the selected XR service.

In operation 511, the UE may establish an XR service session via access to the service entry point received in operation 508. When the XR service session is established, in operation 512, the UE and the XR service provider may proceed with uplink/downlink streaming of media data and metadata.

According to an embodiment of the disclosure, operations 501 through 505 may be performed only when the UE is initially connected to each component device. In other words, after the initial connection, the UE establishes a first XR service session to provide a first XR service to the user, and when a second XR service session needs to be established after the first XR service session ends, operations 501 through 505 may be skipped. In addition, the device description initially reported in operation 501 may instead be reported in operation 505.

Due to not only the importance of a physical environment itself but also diversity of user device configurations that depends on the user's physical environment, device capability information and metadata related to an environment of a user of a component device may be required for high quality XR experiences. The disclosure defines device capability information and metadata related to an environment of a user of a component device, which are required in an XR service session. The device capability information and metadata may be used by entities participating in the XR service session to provide XR services to a user.

In addition, the disclosure proposes a "user space set" used to take into account a user's environment in defining device capability information and metadata. The user space set may be an information set including at least one of information about positions and orientations of various devices located around the user and used to provide XR services, capability information of the devices, or information about a physical environment surrounding the user. The various devices located around the user may be used to define the user space set together with the physical environment surrounding the user. A user space set may exist for each user. In other words, there may be a user space set corresponding to each user.

FIG. 6 is a diagram for describing a user space set according to an embodiment of the disclosure.

According to an embodiment of the disclosure, a user space set may include various parameters indicating an environment around a user (hereinafter, referred to as 'user space set parameters'). The user space set may include information about a space and information about various devices that are located around the user and used to provide XR services. At least some of the devices (i.e., a UE) participating in an XR service session may obtain or process pieces of information necessary for providing the XR services based on various parameters included in the user space set. For example, the UE may receive captured data or vision data from a nearby camera, and process the received captured or vision data based on a user space set. The processed data may be transmitted to a server or another UE, together with the user space set, and may be used to provide other users with 3D media data regarding the user's surrounding environment.

Referring to FIG. 6, the user space set may be represented using a right-handed Cartesian coordinate system in which an origin is defined as a reference point and an x-axis direction is defined as a space set reference orientation. However, this is merely an example, and the user space set may be represented according to various other representation techniques for representing a 3D space. In the disclosure, for convenience, the user space set will be described using a right-handed Cartesian coordinate system as an example of a representation technique. According to the example of FIG. 6, there may be XR glasses 601, a first capture camera 602, and a second capture camera 603 in the user space set, which perform a functionality as a UE, a vision functionality, and a rendering functionality.

Furthermore, the user space set may include one or more subspace sets. According to an embodiment of the disclosure, a vision subspace set defines a space in which 3D media is rendered within a vision subspace and realistically augmented so that the 3D media may be experienced by the user as being a realistic part of scene/background that exists in the vision subspace. One or more vision subspace sets may exist within a single user space set. A vision subspace set may be implemented using one or more vision cameras whose FOVs may overlap or not. In addition, there may be a vision subspace set corresponding to each component device that performs a vision functionality.

According to an embodiment of the disclosure, a capture subspace set defines a space in which a real 3D object may be captured volumetrically by one or more capture cameras. When only a part of the real 3D object exists within the capture subspace set, only the part of the real 3D object may be captured. One or more capture subspace sets may exist within a single user space set. A capture subspace set may be implemented using one or more capture cameras whose FOVs may overlap or not. Furthermore, there may be a capture subspace set corresponding to each component device that performs a capturing functionality.

In addition, although it is described below for convenience that a user space set and a subspace set are each in the shape of a cuboid, the shapes of a user space set and a subspace set are not limited to a cuboid but may be variously determined. Furthermore, a user space set or a subspace set may be static or may be dynamically changed. For example, a shape, size, shape, etc. of a user space set or subspace set may be modified for various reasons (e.g., relocation of a user or device, etc.), and a location of a user space set or subspace set may be changed.

According to an embodiment of the disclosure, a subspace set may be provided for each device or for each functionality type of a device. For example, a vision subspace set 610 may exist for the XR glasses 601, a first capture subspace set 620 for the first capture camera 602, and a second capture subspace set 630 for the second capture camera 603. In addition, the XR glasses 601 may further perform a capturing functionality, and in this case, a separate capture subspace set may be provided for the XR glasses 601 as well. Position and orientation information in the user space set 600 may be determined relative to a reference point 605 of the user space set 600. In addition, position and orientation information in a subspace set may be determined relative to a reference point in the subspace set, and the reference point in the subspace set may be determined relative to the reference point 605 of the user space set 600. For example, a reference point 611 in the vision subspace set 610, a reference point 621 in the first capture subspace set 620, and a reference point 631 in the second capture subspace set 630 may be determined relative to the reference point 605 in the user space set 600.

According to an embodiment of the disclosure, pieces of information necessary for providing XR services may include at least one of pieces of the following information:

The number of devices in a user space set

A device description for each device

A device functionality type of each device. A device functionality type may be used as a basis for using pose information of each device. A device functionality type of each device may include at least one of rendering, vision, or capturing.

A position and an orientation of each device (e.g., a position and orientation of the front of a camera). In other words, a pose of each device relative to a reference point defined in the user space set.

A reference point The reference point may be one of the following:
   arbitrary absolute position coordinates based on real-world coordinates such as global positioning system (GPS) coordinates
   a reference point bound to one of the devices in the user space set.

an indication of whether a position and/or an orientation of a device is static or dynamic;

for a camera device:
   FOV/angle of view
   minimum and maximum values of a sensor depth sensitivity
   intrinsic parameters
   extrinsic parameters According to an embodiment of the disclosure, user space set parameters may include pieces of necessary information for XR services as described above, and may be represented using the following syntax. First, the user space set parameters may be classified into a first parameter group and a second parameter group. According to an embodiment of the disclosure, the second parameter group may be or may not be obtained based on the first parameter group.

According to an embodiment of the disclosure, a syntax for representing the first parameter group is as follows. The first parameter group may include all or some of the parameters described below. In other words, some parameters may be omitted. In addition, the syntax for the first parameter group below is merely an example, and parameters having the same or similar semantics as those in the first parameter group may also be represented according to a different syntax.

```
class NonDerivedParameters( ) {
  SpaceSetReferenceStruct( )
  unsigned int( )        num_components;
  for (i=0; i<num_components; i++){
    InitialPose( )
    unsigned int( )        device_id.
    unsigned int( )        device_description;
    unsigned int( )        dynamic_pose;
    unsigned int( )        num_functionalities;
    for (j=0; j<num_functionalities; j++){
      unsigned int( )        pose_functionality_type;
      InitialPose( )
      if (pose_functionality_type=1,2){
        signed int( )        hor_field_of_view;
        signed int( )        ver_field_of_view;
        signed int( )        minimum_depth;
        signed int( )        maximum_depth;
      }
```

```
      if (pose_functionality_type=2){
        CameraParameters( )
      }
    }
  }
}
class SpaceSetReferenceStruct( ) {
  unsigned int( )        space_set_reference_type;
  if (space set reference type=0){
    signed int( )        gps_latitude;
    signed int( )        gps_longitude;
    signed int( )        world_orientation;
  }
  if (space_set_reference_type=1){
    unsigned int( )        device_id.
  }
  unsigned int( )        dynamic_reference;
}
class InitialPose( ) {
  signed int( )    initial_position_x;
  signed int( )    initial_position_y;
  signed int( )    initial_position_z;
  signed int( )    initial_orientation_x;
  signed int( )    initial_orientation_y;
  signed int( )    initial_orientation_z;
  signed int( )    initial_orientation_w;
}
class CameraParameters( ) {
  IntrinsicParamters( )
  ExtrinsicParameters( )
}
```

According to an embodiment of the disclosure, the semantics of each parameter represented according to the above syntax is as follows.

num_components: It specifies the number of components (component devices) in a user space set.

initial_position_x, initial_position_y, initial_position_z: They specify x, y, and z coordinate values corresponding to coordinates of an initial position of a component device with respect to a user space set reference point. A unit in which coordinate values are expressed may be, for example, centimeter or millimeter, but is not limited thereto and may be variously determined. When a component device is used as a reference device in the user space set (when device_id of the component device matches a device_id value specified as space_set_reference_type=1 in the SpaceSetReferenceStruct), three coordinate values are all set to 0.

initial_orientation_x, initial_orientation_y, initial_orientation_z, initial_orientation_w: They respectively specify x, y, z, and w elements of an orientation quaternion (or Hamilton number) indicating an initial orientation of a component device. w is the real part of the quaternion, and x, y and z are the imaginary parts of the quaternion. When the component device is used as a reference device in the user space set, values of these parameters define a unit quaternion with zero rotation in an orientation of the component device. In this case, initial_orientation_x may indicate a direction of an x-axis of a space set coordinate system (e.g., a right-handed Cartesian coordinate system), and initial_orientation_y may indicate a direction of a y-axis pointing vertically upwards.

space_set_reference_type: It specifies how to define a reference point in the user space set, i.e., an origin (0, 0, 0) and a reference orientation. All the other pieces of pose information for the first parameter group may be defined with a reference point as an origin. The reference orientation may define a direction of an x-axis of a space set coordinate system (e.g., the right-handed Cartesian coordinate system). When a value of space_set_reference_type is 0, the reference point (ground level) and the reference orientation may be respectively defined as real-world GPS coordinates and a real-world orientation. For a component device with the value of space_set_reference_type set to 1, a pose (position coordinates and an orientation) of the component device may be used as a reference point and a reference orientation for the user space set.

gps_latitude, gps_longitude: They specify, in units of decimal degrees (DD), lines of latitude and longitude for GPS coordinates of a reference point (origin) of the user space set coordinate system.

world_orientation: It specifies a world compass orientation in degrees, which is defined as a reference orientation of a space set coordinate system (e.g., an x-axis of the right-handed Cartesian coordinate system) (0 degree corresponds to true north in the real world). The coordinate system may be the right-handed Cartesian coordinate system with a y-axis perpendicular to the x-axis and pointing upwards. A default direction (x-axis) may be true north.

device_id: It specifies a unique identifier of a component device.

dynamic_reference: A flag that specifies whether a reference point in the user space set is static (when a flag value is 0) or dynamic (when the flag value is 1).

device_description: It specifies a description of a component device. The description of the component device may be specified as 1) a description in a predefined list (e.g., "0=glasses, 1=mobile phone, 2=camera") or 2) a description string entry.

dynamic_pose: A flag that specifies whether a pose of a component device is static (when a flag value is 0) or dynamic (when the flag value is 1).

num_functionalities: It designates the number of functionalities (functionalities defined by pose_functionality_type) for which a component device and pose information of the component device are used. A component device identified by one device_id may include one or more functionalities. In other words, a component device may include only one functionality, both capturing and vision functionalities, both capturing and rendering functionalities, both vision and rendering functionalities, or all of the capturing, vision, and rendering functionalities.

pose_functionality_type: It specifies a pose functionality type of a component device. A value of 0 indicates a pose functionality for rendering, a value of 1 specifies a pose functionality for vision, and a value of 2 indicates a pose functionality for capturing.

hor_field_of_view, ver_field_of_view: They respectively specify horizontal and vertical FOV capture or vision capabilities of a component device (e.g., a camera). A unit of FOV may be, for example, radians.

minimum_depth, maximum_depth: They respectively specify minimum and maximum values of a depth capture or vision capability of a component device (e.g., a camera) for a designated functionality. A unit of depth may be, for example, millimeters.

IntrinsicParameters( ), ExtrinsicParameters( ): They respectively specify a list of internal parameters and a list of external parameters for each component device (camera). For example, the internal parameters are parameters for a camera device itself and may include a focal length, a principal point, a skew coefficient, etc., while the external parameters are parameters for describing a transformation relationship between a camera coordinate system and a real-world coordinate system and may include rotation or translation parameters between the two coordinate systems.

Next, according to an embodiment of the disclosure, a syntax for representing the second parameter group is as follows. The second parameter group may include all or some of the parameters described below. In other words, some parameters may be omitted. In addition, the syntax for the second parameter group below is merely an example, and parameters having the same or similar semantics as those in the second parameter group may also be represented according to a different syntax.

```
class SpaceSetSizeStruct( ) {
    unsigned int( )        spacesetsize_cuboid_dx;
    unsigned int( )        spacesetsize_cuboid_dy;
    unsigned int( )        spacesetsize_cuboid_dz;
}
class VisionSubSpaceStruct( ) {
    SubSpaceReferencePointStruct( )
    unsigned int( )        visionsubspacesize_cuboid_dx;
    unsigned int( )        visionsubspacesize_cuboid_dy;
    unsigned int( )        visionsubspacesize_cuboid_dz;
}
class CaptureSubSpaceStruct( ) {
    SubSpaceReferencePointStruct( )
    unsigned int( )        capturesubspacesize_cuboid_dx;
    unsigned int( )        capturesubspacesize_cuboid_dy;
    unsigned int( )        capturesubspacesize_cuboid_dz;
}
class SubSpaceReferencePointStruct( ) {
    signed int( )          offset_x;
    signed int( )          offset_y;
    signed int( )          offset_z;
}
```

According to an embodiment of the disclosure, the semantics of each parameter represented according to the above syntax is as follows:

spacesetsize_cuboid_dx, spacesetsize_cuboid_dy, spacesetsize_cuboid_dz: They specify sizes of a user space set having the form of a cuboid in directions of x-, y-, and z-axes of the Cartesian coordinate system. A reference point in the user space set may be, for example, a center of the cuboid when space_set_reference_type=0, and a center of a bottom face of the cuboid when space_set_reference_type=1. However, this is merely an example, and the position of the reference point may be variously determined.

visionsubspacesize_cuboid_dx, visionsubspacesize_cuboid_dy, visionsubspacesize_cuboid_dz: They specify sizes of a vision subspace set having the form of a cuboid in directions of x-, y-, and z-axes of the Cartesian coordinate system. The sizes in the x, y, and z-axis directions are specified relative to a reference point in the vision subspace set. The reference point in the vision subspace set may be defined by SubSpaceReferencePointStruct( ) included in a vision subspace structure. For example, the reference point (or anchor point) in the vision subspace set may be determined by an edge closest to the reference point in the user space set among edges of the cuboid representing a vision subspace set. The anchor point in the vision subspace set is not limited to the above-described example but may be variously determined.

capturesubspacesize_cuboid_dx, capturesubspacesize_cuboid_dy, capturesubspacesize_cuboid_dz: They specify sizes of a capture subspace set having the form of a cuboid in directions of x-, y-, and z-axes of the Cartesian coordinate system. The sizes in the x, y, and z-axis directions are specified relative to a reference point in the capture subspace set. The reference point in the capture subspace set may be defined by SubSpaceReferencePointStruct( ) included in a capture subspace structure. For example, the reference point (or anchor point) in the capture subspace set may be determined by an edge closest to the reference point in the user space set among edges of the cuboid representing a capture subspace. The anchor point in the capture subspace set is not limited to the above-described example but may be variously determined.

Next, according to an embodiment of the disclosure, third parameter group representing a 3D media object captured by a capture camera in a user space set is described. The third parameter group may be determined based on at least one of the first or second parameter group for the user space set.

According to an embodiment of the disclosure, a syntax for representing the third parameter group is as follows. The third parameter group may include all or some of the parameters described below. That is, some parameters may be omitted. In addition, the syntax for the third parameter group below is merely an example, and parameters having the same or similar semantics as those in the third parameter group may also be represented according to a different syntax.

```
class ObjectSizeStruct( ) {
unsigned int( )    real_size_dx;
unsigned int( )    real_size_dy.
unsigned int( )    real_size_dz;
}
class DefaultOrientationStruct( ) {
unsigned int( )    object_default_orientation_x;
unsigned int( )    object_default_orientation_y;
unsigned int( )    object_default_orientation_z;
unsigned int( )    object_default_orientation_w;
}
class DefaultRenderingParamStruct( ) {
unsigned int( )    min_rendering_distance;
unsigned int( )    max_rendering_distance;
unsigned int( )    default_rendering_distance;
}
```

According to an embodiment of the disclosure, the semantics of each parameter represented according to the above syntax is as follows:

real_size_dx, real_size_dy, real_size_dz: They respectively specify real sizes of a 3D media in x-, y-, and z-directions, which corresponds to a coded cuboid used to represent 3D media data (e.g. a 10-bit bounding box for a V-PCC compressed point cloud). A unit of size may be, for example, millimeter.

object_default_orientation_x, object_default_orientation_y, object_default_orientation_z, object_default_orientation_w: They specify elements of an orientation quaternion representing default rendering orientations of a 3D media object in relation to the coded cuboid used to represent 3D media data (e.g. a 10-bit bounding box for a V-PCC compressed point cloud). For V-PCC coded data, a default rendering orientation may match a pi_front [d] supplemental enhancement information (SEI) message (in the V-PCC specification, pi_front [d] indicates a value of a d-axis of a unit vector representing a front direction of a reconstructed point cloud sequence in units of 2-16. When pi_front[d] does not exist, a default rendering orientation may be assumed to represent a unit vector (0.0, 1.0, 0.0).

min_rendering_distance specifies a minimum distance between a user display and a 3D media object, at which the 3D media object may be rendered and presented to the user. A unit of distance may be, for example, centimeter or millimeter.

max_rendering_distance specifies a maximum distance between a user display and a 3D media object, at which the 3D media object may be rendered and presented to the user. A unit of distance may be, for example, centimeter or millimeter.

default_rendering_distance specifies a default rendering distance between a user display and a 3D media object, at which the 3D media object is rendered and presented to the user upon initial playback. A unit of distance may be, for example, centimeter or millimeter.

The first parameter group, the second parameter group, or the third parameter group described with reference to FIG. 6 are shared among a first UE, a server and/or a second UE as user space set parameters or subspace set parameters, so that the first UE/second UE or the server may understand a space surrounding the second UE/first UE and process an object around the second UE/first UE to control it to be displayed as a 3D XR media object on an XR device.

FIG. 7 is a diagram for describing a flow of media data and metadata according to an embodiment of the disclosure.

FIG. 7 illustrates a flow of media data and metadata, a flow of user space set parameters, and a flow of additional media metadata for XR services (e.g., object size, default orientation, or some or all of the user space set parameters), the flows being among entities participating in an XR service session. Referring to FIG. 7, for convenience, a cloud, a server, an MEC server, and the like are collectively referred to as a cloud. According to an embodiment of the disclosure, all or some parameters included in the first, second, or third parameter group may be selected and transmitted between UEs according to the flow of metadata illustrated in FIG. 7.

According to an embodiment of the disclosure, the flow of media data and metadata may be described using the following syntax.

UE1: Source Device→UE2: Target Device

Here, although each user may have one or more UEs (i.e., a device having a network capability (e.g., a 5G modem capability) to transmit and receive data to and from another user's device over a network), it is assumed for convenience of description that first and second users each have one UE. Thus, UE1 and UE2 refer to a first UE of the first user and a second UE of the second user, respectively. According to an embodiment of the disclosure, each flow of media data and metadata described using the syntax is as follows.

(Operation 701) Pose Information of First User
UE1:glasses→cloud [Purpose: Split rendering]
UE1:glasses→UE2:phone [Purpose: view dependent partial capturing & delivery)/rate adaptation]
user_pose_parameters: SpaceSetReferenceStruct(pose_functionality_type=0)

Split rendering is the process of performing some rendering operations in the cloud.

(Operation 701a) Pose Information of Second User
UE2:glasses→UE1:phone [Purpose: View dependent partial capturing & delivery)/rate adaptation]
UE2:glasses→cloud [Purpose: Split rendering]
user_pose_parameters: SpaceSetReferenceStruct(pose_functionality_type=0)

(Operation 702) 3D/2D Media Data
UE2:phone→UE1:phone [3D data]
cloud→UE1:glasses [2D data, Purpose: Split rendering]

(Operation 702a) 2D Media Data
UE1:camera→UE1:phone
UE1:camera→cloud [Purpose: 3D modeling in cloud]
(Operation 702b) 3D Media Data
UE1:phone→UE2:phone
cloud→UE2:phone
(Operation 703) Vision Information of First User
UE1:phone→UE2:phone/glasses [Purpose: Support of rendering and rate adaptation in UE2]
UE1:phone→cloud [Purpose: Support of cloud-based 3D modeling and split rendering
vision_cam_paramters: SpaceSetReferenceStruct(pose_functionality_type=1) [unprocessed data or first parameter group]
space_set_size: SpaceSetSizeStruct( ) vision-processed data]
space_set_reference_point: SpaceSetReferenceStruct( ) [vision-processed data]
light_source_direction [vision-processed data]
augmentation_type [vision-processed data]
(Operation 703a) Vision information of second user: It may be inferred from the vision information of the first user obtained in operation 703 by replacing UE1 and UE2 with each other.
(Operation 704) 3D Modeling Parameter
UE1:camera→UE1:phone [Passing information between user's devices]
UE1:camera/phone→cloud [Purpose: Cloud 3D modeling]
capture_cam: SpaceSetReferenceStruct(pose_functionality_type=2)
Intrinsic_param: IntrinsicParamters( )
Extrinsic_param: ExtrinsicParameters( )
(Operation 705) 3D Model Information
UE1:phone→UE2:phone/glasses [When 3D modeled in UE]
Cloud→UE2:phone/glasses [When 3D modeled in cloud]
Object size, default orientation, default rendering size, priority When movement of the first user in a first user's space set needs to be mapped correctly to a second user's space set (by being scaled or non-scaled), pose information (or space set information) of the first user such as the first or second parameter group for the first user may be transmitted directly to the second user and used for rendering by the second user. Furthermore, when an object is shared between two users and is visible to the two users, the two users are able to both know exactly in which FOV (from which direction and distance) the other user is looking at the shared object through knowledge about pose information and vision information (space set, etc.) of the other user. Sharing pose information of each user with each other may be useful in real-time use cases such as a case where the two users need to view the shared object at the same distance and angle.

FIG. 8 is a diagram for describing an XR media architecture of a UE, according to an embodiment of the disclosure.

Referring to FIG. 8, it illustrates an XR media architecture including an XR interaction controller 830 of a first UE 81. The first UE 81 of a first user may transmit and receive XR service related information to and from a server (or a second UE) 82 via one or more interfaces. The server 82 may be, for example, a cloud, a MEC server, a data network entry point, or the like. The first UE 81 may transmit data to the server 82, or to the second UE directly or via the server 82.

Each entity in the XR media architecture of the first UE 81 may be a logical entity or a hardware entity. A logical entity may be implemented by various hardware configurations. The XR interaction controller 830 may process and control pose information of component devices (a rendering device, a vision camera, a capture camera, etc.). The pose information of the component devices may be used by an entity such as an XR media player 840 or an XR media generator 850. In addition, when pose information is needed for partial transmission or partial rendering within an XR conversational service, at least a part of the pose information (processed or unprocessed) may be transmitted to the server 82 or directly to the second UE. A function of each entity in the XR media architecture according to an embodiment of the disclosure is as follows.

XR aware application 810: It may control other XR entities in the XR media architecture.

XR media session handler 820: By communicating with the server (or second UE) 82, it may perform capability negotiation for an XR service configuration, establish an XR session, and control (manage) and support the XR session. For example, the capability negotiation may involve determining, based on capabilities of a user's device and requirements of an XR service, an XR service with a level of quality that may be supported based on the capabilities of the user's device between a UE and a server, or determining to perform, in the user's device, only processes which are supportable based on the capabilities of the user's device from among 3D media processes related to the XR service while performing the rest of them in the server.

XR interaction controller 830: It may manage interaction-based services by communicating with the server (or the second UE) 82. The XR interaction controller 830 may provide relevant data to the XR-aware application 810 for interaction control, provide relevant data to the XR media session handler 820 for interaction report control, provide relevant data to an XR media player 840 for vision-based interaction playback, and provide the relevant data to an XR media generator 850 for media generation.

XR media player 840: It may receive XR media content by communicating with the server (or the second UE) 82. The XR media player 840 may provide relevant data to the XR aware application 810 for media playback (media access, depacketization, decapsulation, decoding, rendering, etc.), provide relevant data to the XR media session handler 820 for media session control, and provide relevant data to the XR interaction controller 830 for session interaction.

XR media generator 850: It may produce XR media content by communicating with the server (or the second UE) 82. The XR media generator 850 may provide relevant data to the XR-aware application 810 for media generation (capture, 3D modeling and preprocessing, encoding, encapsulation, packetization, etc.), provide relevant data to the XR media session handler 820 for media session control, and provide relevant data to the XR interaction controller 830 for XR media generation interaction.

According to an embodiment of the disclosure, interface parameters (including metadata that may be shared among interfaces) that may be transmitted by an interface between entities in the XR media architecture are as follows. However, the following is only an example of possible metadata. For example, XR media processing, XR media flow, XR services, etc. according to an embodiment of the disclosure may be enabled via interface parameters transmitted between entities.

Parameters of a first interface (801): metadata required to process data in the server 82. Because both remote rendering and remote content creation may be supported by the server 82, both metadata about the first user and metadata about the second user may be included therein.

User pose information (Purpose: remote rendering):
  NonDerivedParameters(pose_functionality_type=0);
Vision camera information (for remote rendering):
  NonDerivedParameters(pose_functionality_type=1);
Capture camera information (for cloud based 3D modeling and encoding):
  NonDerivedParameters(pose_functionality_type=2);
User space set information (for remote rendering/3Dmodeling):
  SpaceSetReferenceStruct( )
  SpaceSetSizeStruct( )
  VisionSubSpaceStruct( )
  CaptureSubSpaceStruct( )
  SubSpaceReferencePointStruct( )
Media object capture information (uplink: for when most processing done on devices; downlink: for when most rendering is done on device)
  ObjectSizeStruct( )
  DefaultOrientationStruct( )
  DefaultRenderingParamStruct( )
Parameters of a second interface (802): metadata transmitted between the XR interaction controller 830 and the XR media player 840. The metadata is generally metadata information related to the second user. However, it may not be necessary for the XR media player 840 to reproduce the metadata related to the second user. According to an embodiment of the disclosure, the XR media player 840 may not generally have space set related processing capabilities, and may have vision information processing capabilities. However, processing capabilities may be flexibly shared between the XR interaction controller 830 and the XR media player 840. In other words, information is shared between the XR interaction controller 830 and the XR media player 840, so that data that cannot be processed individually may be processed in a collaborative manner.

User pose information (for media playback):
  NonDerivedParameters(pose_functionality_type=0);
Vision camera information (for media playback):
  NonDerivedParameters(pose_functionality_type=1);
User space set information (for media playback):
  SpaceSetReferenceStruct( )
  SpaceSetSizeStruct( )
  VisionSubSpaceStruct( )
  (CaptureSubSpaceStruct( ))
  SubSpaceReferencePointStruct( )
Media object capture information (uplink: for when most processing done on a user's device rather than the server; downlink: for when most rendering is done on a user's device rather than the server)
  ObjectSizeStruct( )
  DefaultOrientationStruct( )
  DefaultRenderingParamStruct( )
Parameters of a third interface (803): According to an embodiment of the disclosure, the XR media generator 850 may not have powerful processing capabilities. Accordingly, the XR media generator 850 may offload 3D media generation and encoding, etc. According to an embodiment of the disclosure, the metadata may be transmitted directly to the server (or the second UE) 82 via a fifth interface (805), or may be transmitted thereto via the first interface (801) after going through the XR interaction controller 830 via the third interface (803). The pose information and vision information of the second user, which are input to the XR media generator 850 via the first interface (801) and the third interface (803), may be used to perform view based partial capturing, generation, delivery, or rendering on a second user's media data for the first user.

Capture camera information (for remote 3D modeling and encoding, etc.):
  NonDerivedParameters(pose_functionality_type=2);
User space set information (optional):
  SpaceSetReferenceStruct( )
  SpaceSetSizeStruct( )
  (VisionSubSpaceStruct( ))
  CaptureSubSpaceStruct( )
  SubSpaceReferencePointStruct( )
Media object capture information (if all processing is performed by the XR media generator 850)
  ObjectSizeStruct( )
  DefaultOrientationStruct( )
  DefaultRenderingParamStruct( )
Parameters of a fourth interface (804): commonly received media manifests such as DASH MPD.
Parameters of the fifth interface (805): When latency is important, particular metadata may be transmitted directly between the XR media generator 850 and the server (or the second UE) 82. In other words, media data may be transmitted directly to the server (or the second UE) 82 via the fifth interface (805) without going through the XR interaction controller 830.

FIG. 9 is a diagram for describing a method, performed by a first UE, of transmitting 3D XR media data to a second UE, according to an embodiment of the disclosure.

Referring to FIG. 9, in operation 910, the first UE may receive, from at least one component device, a capability and status report on the at least one component device.

In operation 920, the first UE may transmit a device capability report regarding an XR service to a server based on the capability and status report.

In operation 930, the first UE may receive device configuration information for the XR service from the server.

In operation 940, the first UE may establish an XR service session based on the device configuration information.

In operation 950, the first UE may process 3D media data and metadata related to the XR service, which are obtained by controlling the at least one component device.

In operation 960, the first UE may transmit the processed 3D media data and metadata to the second UE via the server.

FIG. 10 is a diagram for describing a configuration of a UE or component device according to an embodiment of the disclosure. The UEs, XR devices, or component devices described with reference to FIGS. 1A, 1B, 2A, 2B, and 3 to 9 may each have a configuration as illustrated in FIG. 10. Alternatively, some component devices may include components that are different from those in FIG. 10 (e.g., a camera, a low-power processor, a display, a short-range communication module, etc.). Hereinafter, for convenience of description, a UE will be described as an example.

Referring to FIG. 10, the UE may include a transceiver 1020, a memory 1030, and a processor 1010. However, the components of the UE are not limited thereto. For example, the UE may include more or fewer components than the components described above. For example, the UE may not include the memory 1030. Furthermore, the transceiver 1020, the memory 1030, and the processor 1010 may be implemented as a single chip. Furthermore, the processor 1010 may include one or more processors.

The transceiver 1020 collectively refers to a receiver and a transmitter, and may transmit and receive signals to and from a server, a component device, an XR device, or another UE. For example, the transceiver 1020 may transmit and receive control signals, media data, and metadata. To achieve this, the transceiver 1020 may include an RF transmitter for up-converting and amplifying a frequency of a signal to be transmitted and an RF receiver for low-noise amplifying a received signal and down-converting its frequency. However, this is merely an example of the transceiver 1020, and components of the transceiver 1020 are not limited to the RF transmitter and the RF receiver.

Furthermore, the transceiver 1020 may receive a signal via a radio channel and output the signal to the processor 1010 and transmit a signal output from the processor 1010 via a radio channel.

The memory 1030 may store data and programs necessary for operations of the UE. Furthermore, the memory 1030 may store control information or data included in a signal obtained by the UE. The memory 1030 may include storage media such as read-only memory (ROM), random access memory (RAM), hard discs, compact disc (CD)-ROM, and digital versatile discs (DVDs), or a combination thereof. In addition, the memory 1030 may not exist separately and may be included in the processor 1010.

The processor 1010 may control a series of processes so that the UE may operate according to the embodiments of the disclosure. For example, the processor 1010 may receive control signals, media data, and metadata through the transceiver 1020, and process the received control signals, media data, and metadata. In addition, the processor 1010 may transmit the processed control signals, media data, and metadata through the transceiver 1020. The processor 1010 may include a plurality of processors and execute a program stored in the memory 1030 to perform an operation of controlling the components of the UE.

FIG. 11 is a diagram for describing a configuration of a server according to an embodiment of the disclosure. The cloud, server, or MEC server described with reference to FIGS. 1A, 1B, 2A, 2B, and 3 to 9 may have a configuration as illustrated in FIG. 11. Hereinafter, for convenience of description, a server will be described as an example.

Referring to FIG. 11, the server may include a transceiver 1120, a memory 1130, and a processor 1110. However, the components of the server are not limited thereto. For example, the server may include more or fewer components than those described above. For example, the server may not include the memory 1130. Furthermore, the transceiver 1120, the memory 1130, and the processor 1110 may be implemented as a single chip. Furthermore, the processor 1110 may include one or more processors.

The transceiver 1120 collectively refers to a receiver and a transmitter, and may transmit and receive signals to and from a UE, a component device, an XR device, or another server. For example, the transceiver 1120 may transmit and receive control signals, media data, and metadata. To achieve this, the transceiver 1120 may include an RF transmitter for up-converting and amplifying a frequency of a signal to be transmitted and an RF receiver for low-noise amplifying a received signal and down-converting its frequency. However, this is merely an example of the transceiver 1120, and components of the transceiver 1120 are not limited to the RF transmitter and the RF receiver.

Furthermore, the transceiver 1120 may receive a signal via a radio channel and output the signal to the processor 1110 and transmit a signal output from the processor 1110 via a radio channel.

The memory 1130 may store data and programs necessary for operations of the server. Furthermore, the memory 1130 may store media data or metadata included in a signal obtained by the server. The memory 1130 may include storage media such as ROM, RAM, hard discs, CD-ROM, and DVDs, or a combination thereof. In addition, the memory 1130 may not exist separately and may be included in the processor 1110.

The processor 1110 may control a series of processes such that the server may operate according to the embodiments of the disclosure. For example, the processor 1110 may receive control signals, media data, and metadata through the transceiver 1120, and process the received control signals, media data, and metadata. In addition, the processor 1110 may transmit the processed control signals, media data, and metadata through the transceiver 1120. The processor 1110 may include a plurality of processors and execute a program stored in the memory 1130 to perform an operation of controlling the components of the server.

Figure 12:
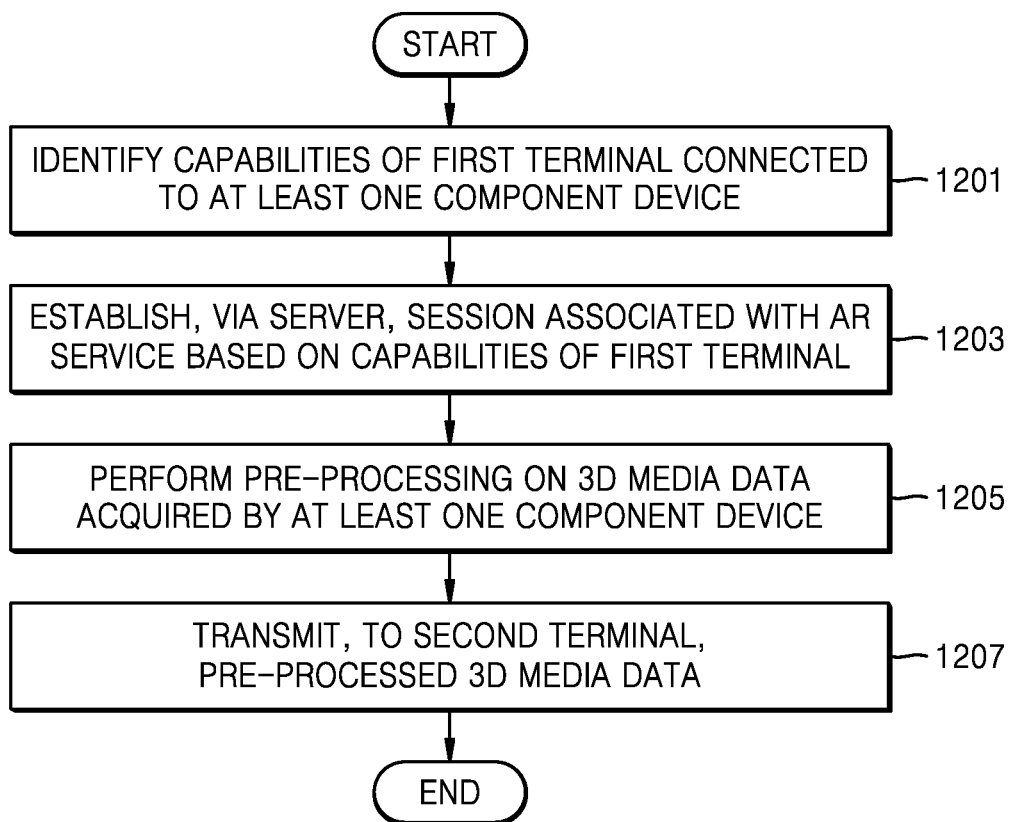
FIG. 12 is a flow chart illustrating a method performed by a first terminal according to an embodiment of the disclosure.

FIG. 12 is a flow chart illustrating a method performed by a first terminal according to an embodiment of the disclosure.

Referring to FIG. 12, in operation 1201, the first terminal may identify capabilities of the first terminal connected to at least one component device. For example, the at least one component device may include at least one of a camera, a speaker, a display and a sensor.

In operation 1203, the first terminal may establish via a server, a session associated with an augmented reality (AR) service based on the capabilities of the first terminal. For example, the first terminal may communicate with the server to establish the session and the AR service may include an AR call between the first terminal and a second terminal. In an embodiment, a type of the session and a configuration of the session are identified based on the capabilities of the first terminal. During the establishment of the session, a format associated with the 3D media data is determined.

In operation 1205, the first terminal may perform pre-processing on 3D media data acquired by the at least one component device. For example, the pre-processing may include a format conversion. In an embodiment, the pre-processed 3D media data is encoded before being transmitted to the second terminal.

In operation 1207, the first terminal may transmit, to the second terminal, the pre-processed 3D media data in a real-time.

Figure 13:
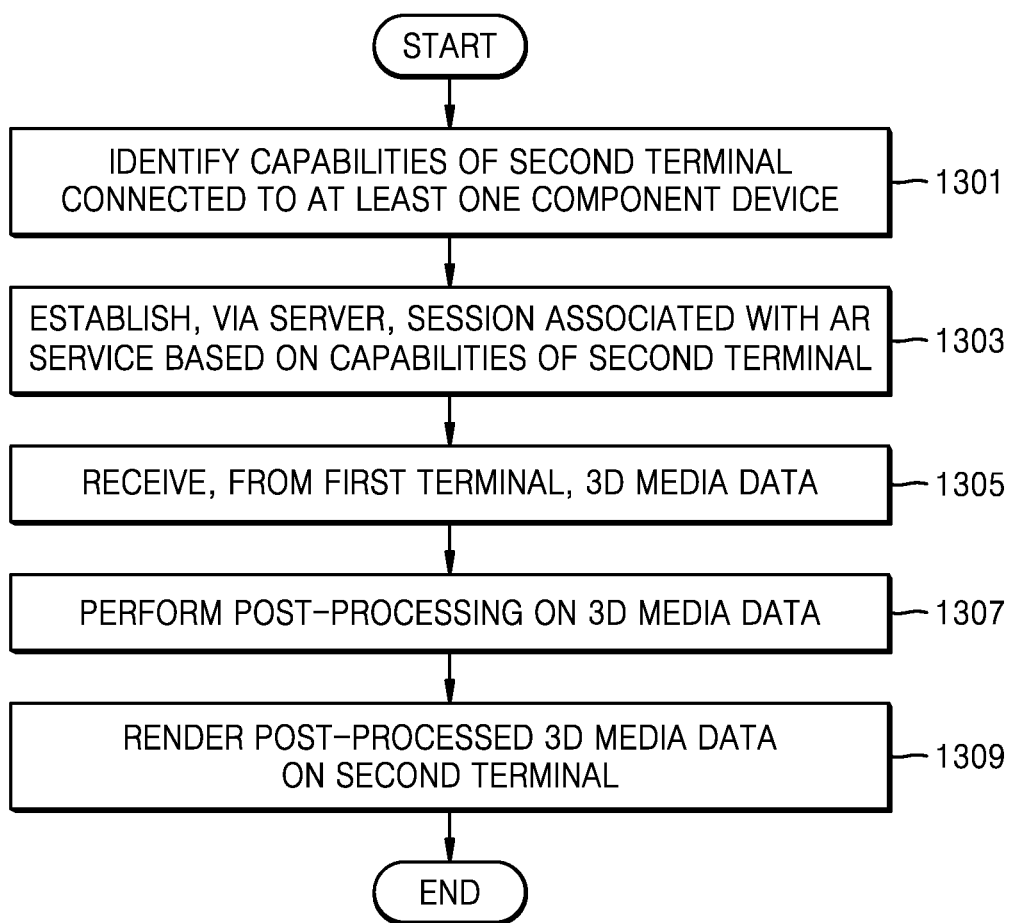
FIG. 13 is a flow chart illustrating a method performed by a second terminal according to an embodiment of the disclosure.

FIG. 13 is a flow chart illustrating a method performed by a second terminal according to an embodiment of the disclosure.

Referring to FIG. 13, in operation 1301, the second terminal may identify capabilities of the second terminal connected to at least one component device. For example, the at least one component device may include at least one of a camera, a sensor, a display and a speaker.

In operation 1303, the second terminal may establish, via a server, a session associated with an augmented reality (AR) service based on the capabilities of the second terminal. For example, the second terminal may communicated with the server to establish the session and the AR service may include an AR call between a first terminal and the second terminal. In an embodiment, a type of the session and a configuration of the session are identified based on the capabilities of the second terminal. During the establishment of the session, a format associated with the 3D media data is determined.

In operation 1305, the second terminal may receive, from the first terminal, 3D media data in a real-time.

In operation 1307, the second terminal may perform post-processing on the 3D media data. For example, the post-processing may include a format conversion.

In operation 1309, the second terminal may render the post-processed 3D media data on the second terminal. In an embodiment, the post-processed 3D media data is decoded before the rendering.

According to an embodiment of the disclosure, a method, performed by a first user equipment (UE), of transmitting 3D XR media data to a second UE includes: receiving, from at least one component device, a capability and status report on the at least one component device; transmitting, to a server, a device capability report regarding an XR service based on the capability and status report; receiving device configuration information for the XR service from the server; establishing an XR service session based on the device configuration information; processing 3D media data and metadata related to the XR service, which are obtained by controlling the at least one component device; and transmitting the processed 3D media data and metadata to the second UE via the server.

The at least one component may include: one or more vision camera devices configured to obtain 3D information about a surrounding environment of a first user of the first UE; one or more capturing camera devices configured to obtain 3D information about an object surrounding the first user; a rendering device configured to render 3D media data related to an XR service of the second UE; and an XR device displaying the rendered 3D media data.

The capability and status report may include at least one of position information, orientation information, or hardware capability information of the at least one component device.

The device capability report may include user space set parameters, and the user space set parameters may include information about a space surrounding the first user of the first UE and information about a position and an orientation of the at least one component device within the surrounding space.

The user space set parameters may include at least one subspace set parameter, and the at least one subspace set parameter may include at least one of one or more vision subspace set parameters or one or more capturing subspace set parameters.

The one or more vision subspace set parameters may represent a target space where one or more vision camera devices from among the at least one component device obtain 3D information about a surrounding environment of the first user, and the one or more capturing subspace set parameters may represent a target space where one or more capturing camera devices from among the at least one component device obtain 3D information about an object surrounding the first user.

The method may further include: receiving, from the server, a list of a plurality of XR services including requirement information regarding each XR service; selecting, based on the capability and status report, one or more XR services from the list of the plurality of XR services; and transmitting a device capability report regarding the selected one or more XR services to the server.

The method may further include transmitting, to the server, a request for at least some of a plurality of 3D media processes for processing the 3D media data to be performed by the server, based on the capability and status report and requirement information regarding the selected one or more XR services.

The method may further include receiving, from the server, information for configuring at least some of a plurality of 3D media processes for processing the 3D media data to be processed by the server.

The method may further include: receiving, from the second UE, 3D media data related to a second user of the second UE and user space set parameters associated with the second user; generating a 3D media object by processing the 3D media data related to the second user based on the user space set parameters associated with the second user; and controlling a display of the first UE or an XR device to display the 3D media object.

According to another embodiment of the disclosure, a first UE for transmitting 3D XR media data to a second UE includes: a transceiver; and at least one processor configured to: control the transceiver to receive, from at least one component device, a capability and status report on the at least one component device; control the transceiver to transmit, to a server, a device capability report regarding an XR service based on the capability and status report; control the transceiver to receive device configuration information for the XR service from the server; establish an XR service session based on the device configuration information; process 3D media data and metadata related to the XR service, which are obtained by controlling the at least one component device; and control the transceiver to transmit the processed 3D media data and metadata to the second UE via the server.

The methods according to the embodiments of the disclosure described in the appended claims or specification thereof may be implemented in hardware, software, or a combination of hardware and software.

When the methods are implemented in software, a computer-readable storage medium storing one or more programs (software modules) may be provided. The one or more programs stored in the computer-readable storage medium are configured for execution by one or more processors within an electronic device. The one or more programs may include instructions that cause the electronic device to execute the methods according to the embodiments of the disclosure described in the claims or specification thereof. Furthermore, a computer program product storing one or more programs may be provided.

These programs (software modules or software) may be stored in RAM, non-volatile memory including a flash memory, ROM, electrically erasable programmable ROM (EEPROM), a magnetic disc storage device, CD-ROM, DVDs or other types of optical storage devices, and a magnetic cassette. Alternatively, the programs may be stored in a memory that is configured as a combination of some or all of the memories. Furthermore, multiple such memories may be included.

Furthermore, the programs may be stored in an attachable storage device that may be accessed through a communication network such as the Internet, Intranet, a local area network (LAN), a wide LAN (WLAN), or a storage area network (SAN), or a communication network configured in a combination thereof. The storage device may access a device for performing operations according to the embodiments of the disclosure via an external port. Furthermore, a separate storage device on a communication network may also access a device for performing the operations according to the embodiments of the disclosure.

In the above-described specific embodiments of the disclosure, a component included in the disclosure is expressed in a singular or plural form depending on a presented embodiment of the disclosure. However, singular or plural expressions are selected to be suitable for situations presented for convenience of description, and the disclosure is not limited to the singular or plural form. An element expressed in a plural form may be configured as a single element, or an element expressed in a singular form may be configured as a plurality of elements.

The embodiments of the disclosure presented in the specification and the accompanying drawings have been provided only as particular examples in order to easily describe technical details according to the disclosure and assist in understanding the disclosure and are not intended to limit the scope of the disclosure. In other words, it is obvious to those of ordinary skill in the art that other modifications may be implementable based on the technical spirit of the disclosure. Furthermore, the embodiments of the disclosure may be combined with one another for operation when necessary. For example, parts of an embodiment of the disclosure and other embodiments of the disclosure are combined with one another so that a UE, a component device, an XR device, and a server may be operated. Furthermore, embodiments of the disclosure may be applicable to other communication systems as well, and other modifications based on the technical spirit of the embodiments of the disclosure may also be implementable.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a wireless communication system, the method comprising:
    identifying capabilities of at least one component device which is connected to the first terminal;
    receiving, from a server, information indicating a list of extended reality (XR) services and configuration information for the XR services;
    determining, an XR service among the list of XR services, based on the capabilities of the at least one component device and the configuration information for the XR services;
    receiving, from the server, information of an entry point corresponding to the XR service;
    establishing a session for the XR service based on the capabilities of the at least one component device, wherein the session for the XR service is associated with the entry point;
    determining a first pre-processing performed by a cloud on three-dimensional (3D) media data for the XR service that is acquired by the at least one component device, based on the capabilities of the at least one component device;
    performing a second pre-processing on the 3D media data; and
    transmitting, to a second terminal, the pre-processed 3D media data, based on the first pre-processing and the second pre-processing.

2. The method of claim 1, wherein a type of the session and a configuration of the session are identified based on the capabilities of the at least one component device.

3. The method of claim 1, wherein the second pre-processing includes a format conversion.

4. The method of claim 1, wherein a format associated with the 3D media data is determined during the establishment of the session.

5. The method of claim 1, wherein the XR service includes an XR call between the first terminal and the second terminal.

6. The method of claim 1, wherein the pre-processed 3D media data is encoded before being transmitted to the second terminal.

7. The method of claim 1, wherein the at least one component device includes a camera.

8. The method of claim 1, wherein the 3D media data is transmitted in real-time.

9. The method of claim 1, wherein the configuration information for the XR services indicates capability requirements for the XR services.

10. The method of claim 9, wherein at least one capability requirement corresponding to the XR service matches with the capabilities of the at least one component device.

11. A method performed by a second terminal in a wireless communication system, the method comprising:
    identifying capabilities of at least one component device which is connected to the second terminal;
    receiving, from a server, information indicating a list of extended reality (XR) services and configuration information for the XR services;
    determining an XR service among the list of XR services, based on the capabilities of the at least one component device and the configuration information for the XR services;
    receiving, from the server, information indicating an entry point corresponding to the XR service;
    establishing a session for the XR service based on the capabilities of the at least one component device, wherein the session for the XR service is associated with the entry point;
    receiving, from a first terminal, three-dimensional (3D) media data for the XR service;
    determining a first post-processing performed by a cloud on the 3D media data, based on the capabilities of the at least one component device;
    performing a second post-processing on the 3D media data; and
    rendering the post-processed 3D media data on the second terminal, based on the first post-processing and the second post-processing.

12. The method of claim 11, wherein a type of the session and a configuration of the session are identified based on the capabilities of the at least one component device.

13. The method of claim 11, wherein the second post-processing includes a format conversion.

14. The method of claim 11, wherein a format associated with the 3D media data is determined during the establishment of the session.

15. The method of claim 11, wherein the XR service includes an XR call between the first terminal and the second terminal.

16. The method of claim 11, wherein the post-processed 3D media data is decoded before the rendering.

17. The method of claim 11, wherein the at least one component device includes a camera.

18. The method of claim 11, wherein the 3D media data is received in real-time.

19. A first terminal in a wireless communication system, the first terminal comprising:
a transceiver; and
at least one processor coupled to the transceiver and configured to:
identify capabilities of at least one component device which is connected to the first terminal,
receive, from a server via the transceiver, information indicating a list of extended reality (XR) services and configuration information for the XR services,
determine an XR service among the list of XR services, based on the capabilities of the at least one component device and the configuration information for the XR services,
receive, from the server via the transceiver, information indicating an entry point corresponding to the XR service,
establish, via the transceiver, a session for the XR service based on the capabilities of the at least one component device, wherein the session for the XR service is associated with the entry point,
determine a first pre-processing performed by a cloud on three-dimensional (3D) media data for the XR service that is acquired by the at least one component device, based on the capabilities of the at least one component device,
perform a second pre-processing on the 3D media data, and
transmit, to a second terminal via the transceiver, the pre-processed 3D media data in a real-time, based on the first pre-processing and the second pre-processing.

20. A second terminal in a wireless communication system, the second terminal comprising:
a transceiver; and
at least one processor coupled to the transceiver and configured to:
identify capabilities of at least one component device which is connected to the second terminal,
receive, from a server via the transceiver, information indicating a list of extended reality (XR) services and configuration information for the XR services,
determine an XR service among the list of XR services, based on the capabilities of the at least one component device and the configuration information for the XR services,
receive, from the server via the transceiver, information indicating an entry point corresponding to the XR service,
establish, via the transceiver, a session for the XR service based on the capabilities of the at least one component device, wherein the session for the XR service is associated with the entry point,
receive, from a first terminal via the transceiver, three-dimensional (3D) media data for the XR service,
determine a first post-processing performed by a cloud on the 3D media data, based on the capabilities of the at least one component device,
perform a second post-processing on the 3D media data, and
render the post-processed 3D media data on the second terminal, based on the first post-processing and the second post-processing.

* * * * *